(12) United States Patent
Yamada et al.

(10) Patent No.: US 12,206,608 B2
(45) Date of Patent: Jan. 21, 2025

(54) TERMINAL APPARATUS AND COMMUNICATION METHOD

(71) Applicant: SHARP KABUSHIKI KAISHA, Sakai (JP)

(72) Inventors: Ryota Yamada, Sakai (JP); Hiromichi Tomeba, Sakai (JP); Hideo Namba, Sakai (JP); Yasuhiro Hamaguchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 594 days.

(21) Appl. No.: 17/288,883

(22) PCT Filed: Oct. 24, 2019

(86) PCT No.: PCT/JP2019/041731
§ 371 (c)(1),
(2) Date: Apr. 26, 2021

(87) PCT Pub. No.: WO2020/090621
PCT Pub. Date: May 7, 2020

(65) Prior Publication Data
US 2022/0006581 A1    Jan. 6, 2022

(30) Foreign Application Priority Data
Oct. 31, 2018    (JP) ................................ 2018-205075

(51) Int. Cl.
*H04L 5/00*    (2006.01)
*H04W 56/00*    (2009.01)
(Continued)

(52) U.S. Cl.
CPC ......... *H04L 5/0048* (2013.01); *H04W 56/001* (2013.01); *H04W 72/1273* (2013.01); *H04W 72/23* (2023.01)

(58) Field of Classification Search
CPC ........... H04W 56/001; H04W 72/1273; H04W 72/23; H04L 5/0053; H04L 5/0048; H04B 7/088
(Continued)

(56) References Cited

U.S. PATENT DOCUMENTS

2017/0238312 A1*  8/2017  Chen ..................... H04L 1/1812
                                                              370/329
2020/0336181 A1* 10/2020  Cao ...................... H04B 7/0626
(Continued)

FOREIGN PATENT DOCUMENTS

EP            3664346 A1    6/2020

OTHER PUBLICATIONS

CMCC, "Discussion on DL multi-TRP transmission", R1-1811048 3GPP TSG RAN WG1 Meeting #94bis, Chengdu, China, Oct. 8-12, 2018.
(Continued)

*Primary Examiner* — Rownak Islam
(74) *Attorney, Agent, or Firm* — ScienBiziP, P.C.

(57) ABSTRACT

Provided are a terminal apparatus and a communication method capable of improving reliability and frequency efficiency in a case that transmission is performed by beamforming. A receiver configured to receive a DMRS, DCI, and a PDSCH, and a decoding unit configured to decode the PDSCH are included, wherein the DCI includes a transmission configuration indicator (TCI) and the number of DMRS antenna ports, the TCI is information indicating a spatial reception filter for receiving the DMRS, the PDSCH includes a transport block, and in a case that two of the TCIs are indicated and the number of DMRS antenna ports is less than or equal to a prescribed number, and that the DCI includes a configuration of one transport block, the PDSCH transmitted from a part of the DMRS antenna ports is
(Continued)

received based on a first TCI, and the PDSCH transmitted from a rest of the DMRS antenna ports is received based on a second TCI to decode the one transport block.

3 Claims, 4 Drawing Sheets

(51) Int. Cl.
*H04W 72/1273* (2023.01)
*H04W 72/23* (2023.01)

(58) Field of Classification Search
USPC .......................................... 370/329
See application file for complete search history.

(56) References Cited

U.S. PATENT DOCUMENTS

| | | | | |
|---|---|---|---|---|
| 2020/0359407 | A1* | 11/2020 | Takeda | H04W 72/23 |
| 2021/0204231 | A1* | 7/2021 | Harada | H04L 5/001 |
| 2021/0281374 | A1* | 9/2021 | Kim | H04J 13/0048 |
| 2021/0359808 | A1* | 11/2021 | Takeda | H04L 5/0023 |

OTHER PUBLICATIONS

CHTTL, "Discussion on Multi-TRP/Panel transmission enhancements", R1-1810815 3GPP TSG RAN WG1 Meeting #94bis, Chengdu, China, Oct. 8-12, 2018.

Huawei et al., "Remaining details of QCL assumptions", R1-1719443 3GPP TSG RAN WG1 Meeting #91, Reno, USA, Nov. 27-Dec. 1, 2017.

Huawei et al., "Summary of AI: 7.2.8.2 Enhancements on Multi-TRP/Panel Transmission", R1-1811882 3GPP TSG RAN WG1 Meeting #94bis, Chengdu, China, Oct. 8-12, 2018 http://www.3gpp.org/ftp/tsg_ran/WG1_RL1/TSGR1_94b/Docs/R1-1811882.zip [access: Apr. 22, 2021].

Nokia et al., "Feature lead summary on QCL", R1-1807664 3GPP TSG RAN WG1#93, Busan, Korea, May 21-25, 2018 http://www.3gpp.org/ftp/tsg_ran/WG1_RL1/TSGR1_93/Docs/R1-1807664.zip [access: Apr. 22, 2021].

"IMT Vision—Framework and overall objectives of the future development of IMT for 2020 and beyond", M Series Mobile, radiodetermination, amateur and related satellite services, Recommendation ITU-R M.2083-0 (Sep. 2015).

Erik G. Larsson et al., "Massive MIMO for Next Generation Wireless Systems", IEEE Communications Magazine, vol. 52, No. 2, pp. 186-195, Feb. 2014.

Huawei et al., "Remaining issues on QCL", R1-1801461, 3GPP TSG RAN WG1 Meeting #92, Athens, Greece, Feb. 26, 2018-Mar. 2, 2018, [retrieved on Feb. 16, 2018].

* cited by examiner

TERMINAL APPARATUS AND COMMUNICATION METHOD

TECHNICAL FIELD

The present invention relates to a terminal apparatus and a communication method. This application claims priority based on JP 2018-205075 filed on Oct. 31, 2018, the contents of which are incorporated herein by reference.

BACKGROUND ART

Research and development activities related to the 5th generation mobile radio communication system (5G system) have been actively carried out, aiming to start commercial services around the year 2020. A vision recommendation on the standard system of the 5G system (International mobile telecommunication—2020 and beyond: IMT-2020) was recently reported (see NPL 1) by the International Telecommunication Union Radio Communications Sector (ITU-R), which is an international standardization body.

Ensuring frequency resources is an important challenge for a communication system to address rapid increase of data traffic. Therefore, in 5G, it is one of the targets to achieve ultra-large capacity communications using higher frequency bands than the frequency bands used in Long term evolution (LTE). However, in wireless communication using high frequency bands, pathloss is a problem. In order to compensate for pathloss, beamforming by multiple antennas is a promising technique (see NPL 2).

CITATION LIST

Non Patent Literature

NPL 1: "IMT Vision—Framework and overall objectives of the future development of IMT for 2020 and beyond," Recommendation ITU-R M. 2083-0, September 2015.

NPL 2: E. G. Larsson, O. Edfors, F. Tufvesson, and T. L. Marzetta, "Massive MIMO for next generation wireless system," IEEE Commun. Mag., vol. 52, no. 2, pp. 186-195, February 2014.

SUMMARY OF INVENTION

Technical Problem

However, beamforming especially in high frequency bands may lead to a problem in reliability, frequency efficiency, or throughput, specifically a cutoff of a channel by blocking of a person or an object, or, a low-rank communication for example, due to high spatial correlation in Line of Sight (LOS) environments.

An aspect of the present invention has been made in view of such circumstances, and an object of the present invention is to provide a base station apparatus, a terminal apparatus, and a communication method capable of improving reliability, frequency efficiency, or throughput in a case that the base station apparatus or the terminal apparatus performs beamforming transmission.

Solution to Problem

To address the above-mentioned drawbacks, a terminal apparatus and a communication method according to an aspect of the present invention are configured as follows.

A terminal apparatus according to an aspect of the present invention includes: a receiver configured to receive a demodulation reference signal (DMRS), downlink control information (DCI), and a downlink shared channel (PDSCH); and a decoding unit configured to decode the PDSCH, wherein the DCI includes a transmission configuration indicator (TCI) and the number of DMRS antenna ports, the TCI is information indicating a spatial reception filter for receiving the DMRS, the PDSCH includes a transport block, and in a case that two of the TCIs are indicated and the number of DMRS antenna ports is less than or equal to a prescribed number, and the DCI includes a configuration of one transport block, the PDSCH transmitted from a part of the DMRS antenna ports is received based on a first TCI, and the PDSCH transmitted from a rest of the DMRS antenna ports is received based on a second TCI to decode the one transport block.

In a terminal apparatus according to an aspect of the present invention, a size of the transport block may be calculated based on the part of the DMRS antenna ports.

In a terminal apparatus according to an aspect of the present invention, in a case that the DCI includes a configuration of two transport blocks, in a part of the DMRS antenna ports, the PDSCH may be received based on a first TCI to decode a first transport block, and in a rest of the DMRS antenna ports, the PDSCH may be received based on a second TCI to decode a second transport block.

In a terminal apparatus according to an aspect of the present invention, in a case that two of the TCIs are indicated and the number of DMRS antenna ports is greater than the prescribed number, the PDSCH transmitted from the DMRS antenna ports may be received based on the first TCI, and the PDSCH transmitted from the DMRS antenna ports may be received based on the second TCI to decode the one transport block.

A communication method according to an aspect of the present invention is a communication method for a terminal apparatus, the communication method including the steps of: receiving a demodulation reference signal (DMRS), downlink control information (DCI), and a downlink shared channel (PDSCH); and decoding the PDSCH, wherein the DCI includes a transmission configuration indicator (TCI) and the number of DMRS antenna ports, the TCI is information indicating a spatial reception filter for receiving the DMRS, the PDSCH includes a transport block, and in a case that two of the TCIs are indicated and the number of DMRS antenna ports is less than or equal to a prescribed number, and the DCI includes a configuration of one transport block, the PDSCH transmitted from a part of the DMRS antenna ports is received based on a first TCI, and the PDSCH transmitted from a rest of the DMRS antenna ports is received based on a second TCI to decode the one transport block.

Advantageous Effects of Invention

According to an aspect of the present invention, by the base station apparatus or the terminal apparatus communicating by beamforming, it is possible to improved reliability, frequency efficiency, or throughput.

DESCRIPTION OF EMBODIMENTS

A communication system according to the present embodiment includes a base station apparatus (a transmitter, a cell, a transmission point, a group of transmit antennas, a group of transmit antenna ports, component carriers, an eNodeB, gNodeB, a transmission point, a transmission and/or reception point, a transmission panel, an access point, and a subarray) and a terminal apparatus (a terminal, a mobile terminal, a reception point, a reception terminal, a receiver, a group of receive antennas, a group of receive antenna ports, a UE, a reception point, a reception panel, a station, and a subarray). A base station apparatus connected to a terminal apparatus (base station apparatus that establishes a radio link with a terminal apparatus) is referred to as a serving cell.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
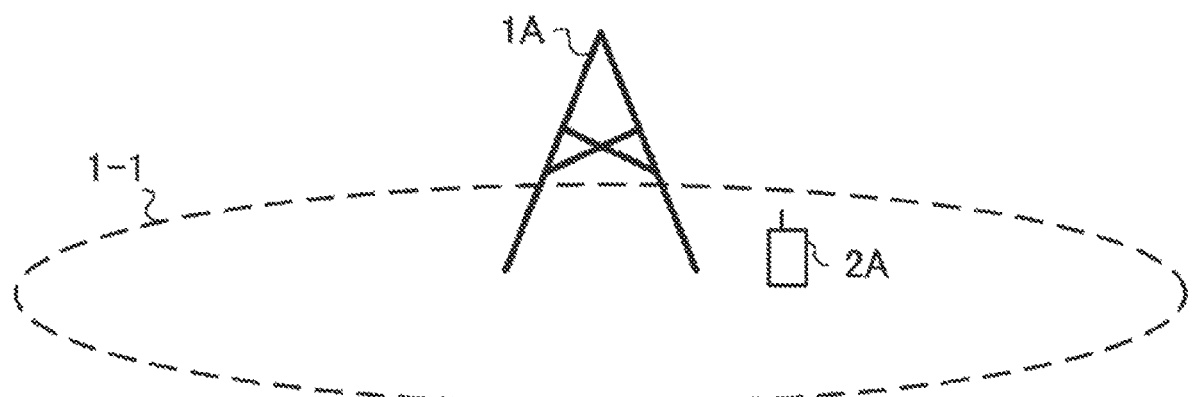
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. Coverage 1-1 is a range (a communication area) in which the base station apparatus 1A can connect to the terminal apparatuses. The base station apparatus 1A is also simply referred to as a base station apparatus. The terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.
Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive Acknowledgement (ACK) or a Negative Acknowledgement (NACK) (ACK/NACK) for downlink data (a downlink transport block or a Downlink-Shared Channel (DL-SCH)). ACK/NACK for the downlink data is also referred to as HARQ-ACK or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. The Channel State Information refers to a Rank Indicator (RI) for specifying a preferable spatial multiplexing order, a Precoding Matrix Indicator (PMI) for specifying a preferable precoder, a Channel Quality Indicator (CQI) for specifying a preferable transmission rate, a CSI-Reference Signal (RS) Resource Indicator (CRI) for specifying a preferable CSI-RS resource, a Reference Signal Received Power (RSRP) measured by a CSI-RS or a Synchronization Signal (SS), and the like.

The Channel Quality Indicator CQI (hereinafter, referred to as a CQI value) can be a preferable modulation scheme (e.g., QPSK, 16QAM, 64QAM, 256QAM, or the like) and a preferable coding rate in a prescribed band (details of which will be described later). The CQI value can be an index (CQI Index) determined by the above modulation scheme, coding rate, and the like. The CQI value can take a value predetermined in the system.

The CRI indicates a CSI-RS resource whose received power/received quality is preferable from multiple CSI-RS resources.

Note that the Rank Indicator and the Precoding Quality Indicator can take the values predetermined in the system. The Rank Indicator and the Precoding Matrix Indicator can be an index determined by the spatial multiplexing order and Precoding Matrix information. Note that some or all of the CQI value, the PMI value, the RI value, and the CRI value are also collectively referred to as "CSI values".

A PUSCH is used for transmission of uplink data (an uplink transport block, UL-SCH). The PUSCH may be used for transmission of ACK/NACK and/or Channel State Information along with the uplink data. The PUSCH may be used to transmit the uplink control information only.

The PUSCH is used to transmit an RRC message. The RRC message is a signal/information that is processed in a Radio Resource Control (RRC) layer. The PUSCH is used to transmit an MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. The Uplink Reference Signal includes a DeModulation Reference Signal (DMRS), a Sounding Reference Signal (SRS), and a Phase-Tracking reference signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. The SRS is used for uplink observation (sounding). The PT-RS is used to compensate for phase noise. Note that a DMRS of the uplink is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.
Physical Broadcast Channel (PBCH)
Physical Control Format Indicator Channel (PCFICH)
Physical Hybrid automatic repeat request (HARQ) Indicator Channel (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is used commonly by the terminal apparatuses. The PCFICH is used for transmission of information for indicating a region (e.g., the number of Orthogonal Frequency Division Multiplexing (OFDM) symbols) to be used for transmission of PDCCH. Note that the MIB is also referred to as a minimum system information.

The PHICH is used for transmission of ACK/NACK with respect to uplink data (a transport block, a codeword) received by the base station apparatus 1A. In other words, the PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and DTX for indicating that no corresponding data is present. In a case that the PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

For example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

The DCI format for the uplink can be used to request Channel State Information (CSI; also referred to as reception quality information) for the downlink (CSI request).

The DCI format for the uplink can be used for a configuration for indicating an uplink resource to which a CSI feedback report is mapped, the CSI feedback report being fed back to the base station apparatus by the terminal apparatus. For example, the CSI feedback report can be used for a configuration for indicating an uplink resource that periodically reports Channel State Information (Periodic CSI). The CSI feedback report can be used for a mode configuration (CSI report mode) for periodically reporting the Channel State Information.

For example, the CSI feedback report can be used for a configuration for indicating an uplink resource that reports aperiodic Channel State Information (Aperiodic CSI). The CSI feedback report can be used for a mode configuration (CSI report mode) for aperiodically reporting the Channel State Information.

For example, the CSI feedback report can be used for a configuration for indicating an uplink resource that reports semi-persistent Channel State Information (semi-persistent CSI). The CSI feedback report can be used for a mode configuration (CSI report mode) for reporting the semi-persistent Channel State Information. Note that the semi-persistent CSI report is periodically reporting CSI in a period since activated with higher layer signaling or downlink control information until deactivated.

The DCI format for the uplink can be used for a configuration for indicating a type of the CSI feedback report that is fed back to the base station apparatus by the terminal apparatus. The type of the CSI feedback report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information on the scheduled PUSCH.

The PDSCH is used to transmit the downlink data (the downlink transport block, DL-SCH). The PDSCH is used to transmit a system information block type 1 message. The system information block type 1 message is cell-specific information.

The PDSCH is used to transmit a system information message. The system information message includes a system information block X other than the system information block type 1. The system information message is cell-specific information.

The PDSCH is used to transmit an RRC message. Here, the RRC message transmitted from the base station apparatus may be shared by multiple terminal apparatuses in a cell. The RRC message transmitted from the base station apparatus 1A may be a dedicated message (also referred to as dedicated signaling) to a given terminal apparatus 2A. In other words, user equipment specific (user equipment unique) information is transmitted by using the message dedicated to the certain terminal apparatus. PDSCH is used to transmit MAC CE.

Here, the RRC message and/or MAC CE is also referred to as higher layer signaling.

The PDSCH can be used to request downlink channel state information. The PDSCH can be used for transmission of an uplink resource to which a CSI feedback report is mapped, the CSI feedback report being fed back to the base station apparatus by the terminal apparatus. For example, the CSI feedback report can be used for a configuration for indicating an uplink resource that periodically reports Channel State Information (Periodic CSI). The CSI feedback report can be used for a mode configuration (CSI report mode) for periodically reporting the Channel State Information.

The type of the downlink Channel State Information report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization signal (SS) and a Downlink Reference Signal (DL RS) are used as downlink physical signals. The downlink physical signals are not used for transmission of information output from the higher layers, but are used by the physical layer. Note that the synchronization signal includes a Primary Synchronization Signal (PSS) and a Secondary Synchronization Signal (SSS).

The synchronization signal is used for the terminal apparatus to take synchronization in the frequency domain and the time domain in the downlink. The synchronization signal is used to measure received power, received quality, or Signal-to-Interference and Noise power Ratio (SINR). Note that the received power measured by the synchronization signal is also referred to as a Synchronization Signal-Reference Signal Received Power (SS-RSRP), the received quality measured by the synchronization signal is also referred to as a Reference Signal Received Quality (SS-RSRQ), and an SINR measured by the synchronization signal is also referred to as an SS-SINR. Note that the SS-RSRQ is a ratio between the SS-RSRP and the RSSI. The Received Signal Strength Indicator (RSSI) is the total average received power for a certain observation period. The synchronization signal/downlink reference signal is used for the terminal apparatus to perform channel compensation on a downlink physical channel. For example, the synchronization signal/downlink reference signal is used for the terminal apparatus to calculate the downlink Channel State Information.

Here, the downlink reference signal includes a Demodulation Reference Signal (DMRS), a Non-Zero Power Channel State Information-Reference Signal (NZP CSI-RS), a Zero Power Channel State Information-Reference Signal (ZP CSI-RS), a PT-RS, and a Tracking Reference Signal (TRS). Note that a DMRS of the downlink is also referred to as a downlink DMRS. Note that in the following embodiments, the NZP CSI-RS and/or the ZP CSI-RS are included in a case of simply referring to CSI-RS.

The DMRS is transmitted in a subframe and a band that are used for transmission of PDSCH/PBCH/PDCCH/EPDCCH related to DMRS, and is used to demodulate PDSCH/PBCH/PDCCH/EPDCCH related to DMRS.

A resource for NZP CSI-RS is configured by the base station apparatus 1A. For example, the terminal apparatus 2A performs signal measurement (channel measurement) or interference measurement by using the NZP CSI-RS. The NZP CSI-RS is also used for beam scanning for searching a preferable beam direction, beam recovery for recovering in a case of the received power/received quality in the beam direction deteriorates, or the like. A resource for ZP CSI-RS is configured by the base station apparatus 1A. With zero output, the base station apparatus 1A transmits ZP CSI-RS. The terminal apparatus 2A performs interference measurement in a resource to which ZP CSI-RS corresponds, for example. Note that the resource for interference measurement corresponding to the ZP CSI-RS is also referred to as a CSI-Interference Measurement (IM) resource.

The base station apparatus 1A transmits (configures) the NZP CSI-RS resource configuration for the resource of the NZP CSI-RS. The NZP CSI-RS resource configuration includes some or all of one or more NZP CSI-RS resource mappings, a CSI-RS resource ID of each NZP CSI-RS resource, and the number of antenna ports. The CSI-RS resource mapping is information indicating an OFDM symbol and a subcarrier (e.g., a resource element) in a slot in which the CSI-RS resource is allocated. The CSI-RS resource ID is used to identify the NZP CSI-RS resource.

The base station apparatus 1A transmits (configures) the CSI-IM resource configuration. The CSI-IM resource configuration includes one or more CSI-IM resource mappings, and a CSI-IM resource configuration ID for each CSI-IM resource. The CSI-IM resource mapping is information indicating an OFDM symbol and a subcarrier (e.g., a resource element) in a slot in which the CSI-IM resource is allocated. The CSI-IM resource configuration ID is used to identify the CSI-IM configuration resource.

The CSI-RS is used to measure received power, received quality, or SINR. The received power measured by the CSI-RS is referred to as a CSI-RSRP, the received quality measured by the CSI-RS is referred to as a CSI-RSRQ, and the SINR measured by the CSI-RS is also referred to as a CSI-SINR. Note that the CSI-RSRQ is a ratio between the CSI-RSRP and the RSSI.

The CSI-RS is transmitted periodically/non-periodically/semi-persistently.

The terminal apparatus is configured with a higher layer with respect to CSI. For example, the terminal apparatus is configured with a CSI report configuration that is a configuration of the CSI report, a CSI resource configuration that is a configuration of the resource for measuring the CSI, and a measurement link configuration for linking the CSI report configuration and the CSI resource configuration for the CSI measurement. One or more of report configurations, resource configurations, and measurement link configurations are configured.

The CSI report configuration includes some or all of a report configuration ID, a report configuration type, a codebook configuration, a CSI report amount, and a block error rate target. The report configuration ID is used to identify the CSI report configuration. The report configuration type indicates a periodic/non-periodic/semi-persistent CSI report. The CSI report amount indicates the reported amount (value, type), for example, some or all of CRI, RI, PMI, CQI, or RSRP. The block error rate target is a target of block error rate that is assumed in a case of computing the CQI.

The CSI resource configuration includes some or all of a resource configuration ID, a synchronization signal block resource measurement list, a resource configuration type, or one or more resource set configurations. The resource configuration ID is used to identify a resource configuration. The synchronization signal block resource configuration list is a list of resources for which measurements are made using synchronization signals. The resource configuration type indicates whether the CSI-RS is transmitted periodically, non-periodically, or semi-persistently. Note that in the case of a configuration in which the CSI-RS is transmitted semi-persistently, the CSI-RS is periodically transmitted during a period since activated with higher layer signaling or downlink control information until deactivated.

The CSI-RS resource set configuration includes some or all of a CSI-RS resource set configuration ID, resource repetition, and information indicating one or more CSI-RS resources. The resource set configuration ID is used to identify the CSI-RS resource set configuration. The resource repetition indicates the on/off of resource repetition within the resource set. In a case that the resource repetition is on, it means that the base station apparatus uses a fixed (identical) transmit beam in each of multiple CSI-RS resources in the resource set. In other words, in a case that the resource repetition is on, the terminal apparatus assumes that the base station apparatus is using a fixed (identical) transmit beam in each of multiple CSI-RS resources in the resource set. In a case that the resource repetition is off, it means that the base station apparatus does not use a fixed (identical) transmit beam on each of multiple CSI-RS resources in the resource set. In other words, in a case that the resource repetition is off, the terminal apparatus assumes that the base station apparatus is not using a fixed (identical) transmit beam on each of multiple CSI-RS resources in the resource set. The information indicating the CSI-RS resource includes one or more CSI-RS resource IDs, and one or more CSI-IM resource configuration IDs.

The measurement link configuration includes some or all of the measurement link configuration ID, the report configuration ID, and the resource configuration ID, and the CSI report configuration and the CSI resource configuration are linked with each other. The measurement link configuration ID is used to identify the measurement link configuration.

The PT-RS is associated with the DMRS (DMRS port group). The number of antenna ports of the PT-RS is one or two, and each PT-RS port (PT-RS antenna port) is associated with a DMRS port group (DMRS antenna port group). The terminal apparatus assumes that the PT-RS port and the DMRS port (DMRS antenna port) are in QCL for delay spread, Doppler spread, Doppler shift, average delay, and spatial reception (Rx) parameters. The base station apparatus configures the PT-RS configuration with higher layer signaling. In a case that the PT-RS configuration is configured, the PT-RS can be transmitted. The PT-RS is not transmitted in a case of a prescribed MCS (e.g., in a case that the modulation scheme is QPSK). The PT-RS configuration is configured with a time density and a frequency density. The time density indicates the time interval at which the PT-RS is allocated. The time density is indicated as a function of the scheduled MCS. The time density includes no PT-RS present (not transmitted). The frequency density indicates the frequency interval at which the PT-RS is allocated. The frequency density is indicated as a function of the scheduled bandwidth. The frequency density includes no PT-RS present (not transmitted). Note that in a case that the time density or the frequency density indicates that no PT-RS is present (not transmitted), no PT-RS is present (transmitted).

Multimedia Broadcast Multicast Service Single Frequency Network (MBSFN)

The RS is transmitted in the entire band of a subframe used for transmission of a PMCH. An MBSFN RS is used to demodulate the PMCH. The PMCH is transmitted through the antenna port used for transmission of the MBSFN RS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

For terminal apparatuses that supports Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

In Dual Connectivity (DC), a Master Cell Group (MCG) and a Secondary Cell Group (SCG) are configured as a group of serving cells. The MCG includes a PCell and optionally one or more SCells. The SCG includes a primary SCell (PSCell) and optionally one or more SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

The slot includes 14 OFDM symbols. Since an OFDM symbol length may vary depending on a subcarrier spacing, the slot length may also vary depending on the subcarrier spacing. The mini-slot includes OFDM symbols fewer than the slots. The slot/mini-slot can be used as a scheduling unit. Note that the terminal apparatus may recognize the position (mapping) of the first downlink DMRS in slot based scheduling/mini-slot based scheduling. In the slot based scheduling, the first downlink DMRS is mapped to the third or fourth symbol of the slot. In the mini-slot based scheduling, the first downlink DMRS is mapped to the first symbol of the scheduled data (resource, PDSCH). Note that the slot based scheduling is also referred to as PDSCH mapping type A. The mini-slot based scheduling is also referred to as PDSCH mapping type B.

The resource block is defined by 12 continuous subcarriers. The resource element is defined by an index of the frequency domain (e.g., a subcarrier index) and an index of the time domain (e.g., OFDM symbol index). The resource element is classified as an uplink resource element, a downlink element, a flexible resource element, and a reserved resource element. In the reserved resource element, the terminal apparatus does not transmit an uplink signal and does not receive a downlink signal.

Multiple Subcarrier spacings (SCSs) are supported. For example, the SCS is 15/30/60/120/240/480 kHz.

The base station apparatus/terminal apparatus can communicate in a licensed band or an unlicensed band. The base station apparatus/terminal apparatus can perform carrier aggregation communication in which the licensed band serves as the PCell and at least one SCell operates in an unlicensed band. The base station apparatus/terminal apparatus can communicate in dual connectivity in which the master cell group communicates with the licensed band and the secondary cell group communicates in the unlicensed band. The base station apparatus/terminal apparatus can communicate only with the PCell in the unlicensed band. The base station apparatus/terminal apparatus can communicate with CA or DC only in the unlicensed band. Note that communication in which the licensed band serves as the PCell and a cell in the unlicensed band (SCell, PSCell) is assisted by, for example, CA, DC, or the like, is also referred to as Licensed-Assisted Access (LAA). The communication of the base station apparatus/terminal apparatus only in the unlicensed band is also referred to as Unlicensed-standalone access (ULSA). The communication of the base station apparatus/terminal apparatus only in the licensed band is also referred to as Licensed Access (LA).

Figure 2:
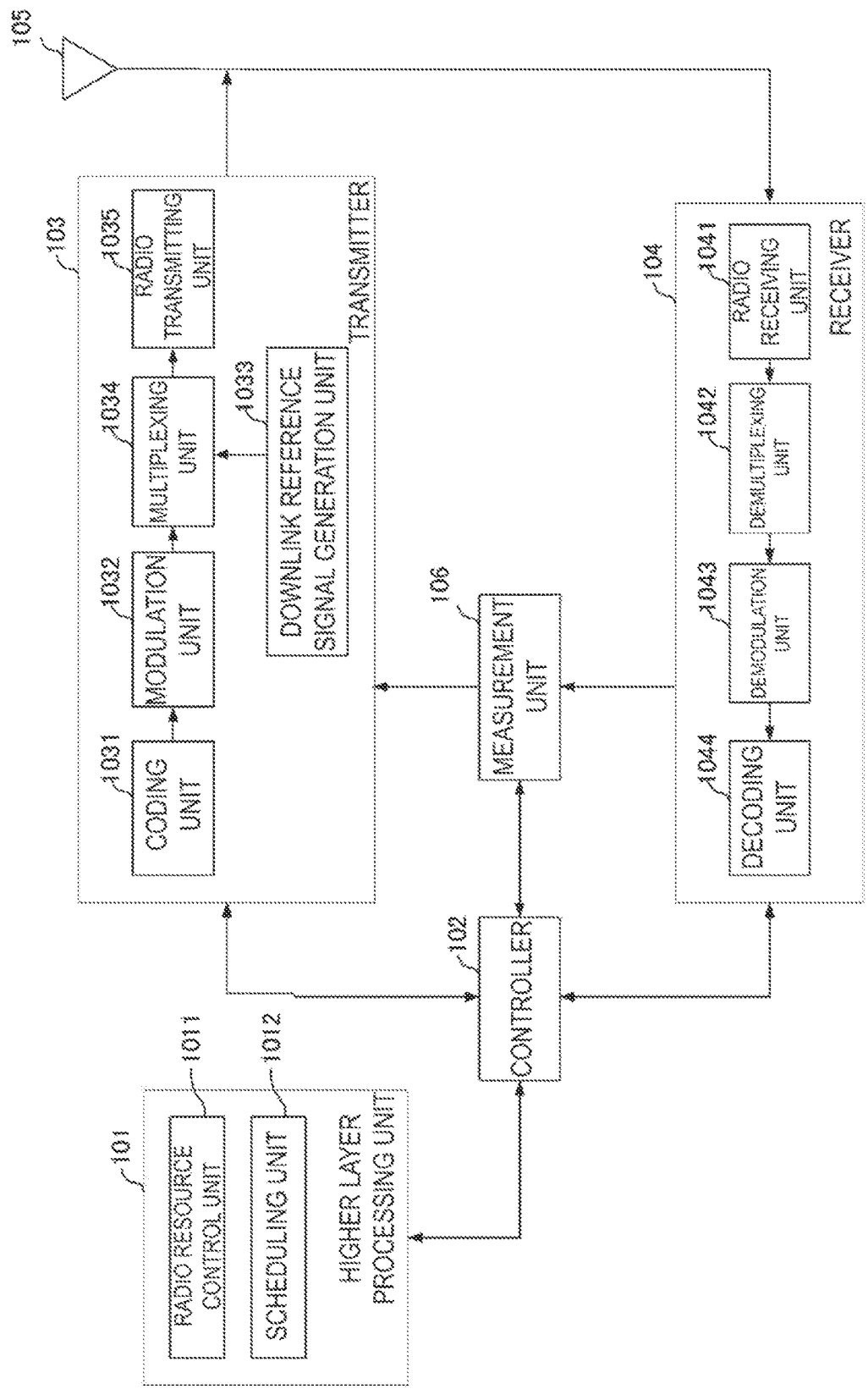
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and/or receive antenna 105, and a measurement unit (measurement step) 106. The higher layer processing unit 101 includes a radio resource control unit (radio resource controlling step) 1011 and a scheduling unit (scheduling step) 1012. The transmitter 103 includes a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 includes a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. The higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case that a terminal apparatus does not support a prescribed function, the terminal apparatus does not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. The radio resource control unit 1011 manages various configuration information of the terminal apparatuses.

The scheduling unit 1012 determines a frequency and a subframe to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and/or receive antenna 105.

The coding unit 1031 codes the HARQ indicator, the downlink control information, and the downlink data that are input from the higher layer processing unit 101, in compliance with a predetermined coding scheme, such as block coding, convolutional coding, turbo coding, Low density parity check (LDPC) coding, and Polar coding, or in compliance with a coding scheme determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), quadrature amplitude modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like, generates an OFDM symbol, adds a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and uplink reference signal. The demultiplexing is performed based on radio resource allocation information, included in the uplink grant notified to each of the terminal apparatuses 2A, that is predetermined by the base station apparatus 1A by using the radio resource control unit 1011.

The demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus 1A notified to the terminal apparatuses 2A in advance by using the uplink grant.

The decoding unit 1044 decodes the coded bits of PUCCH and PUSCH that have been demodulated, at a coding rate, in compliance with a predetermined coding scheme, that is predetermined or notified from the base station apparatus 1A to the terminal apparatus 2A in advance by using the uplink grant, and outputs the decoded uplink data and uplink control information to the higher layer processing unit 101. In a case that PUSCH is retransmitted, the decoding unit 1044 performs the decoding by using the coded bits that is input from the higher layer processing unit 101 and retained in an HARQ buffer, and the demodulated coded bits.

The measurement unit 106 observes the reception signal, and determines various measurement values such as RSRP/RSRQ/RSSI. The measurement unit 106 determines the received power, the received quality, and a preferable SRS resource index from the SRS transmitted from the terminal apparatus.

Figure 3:
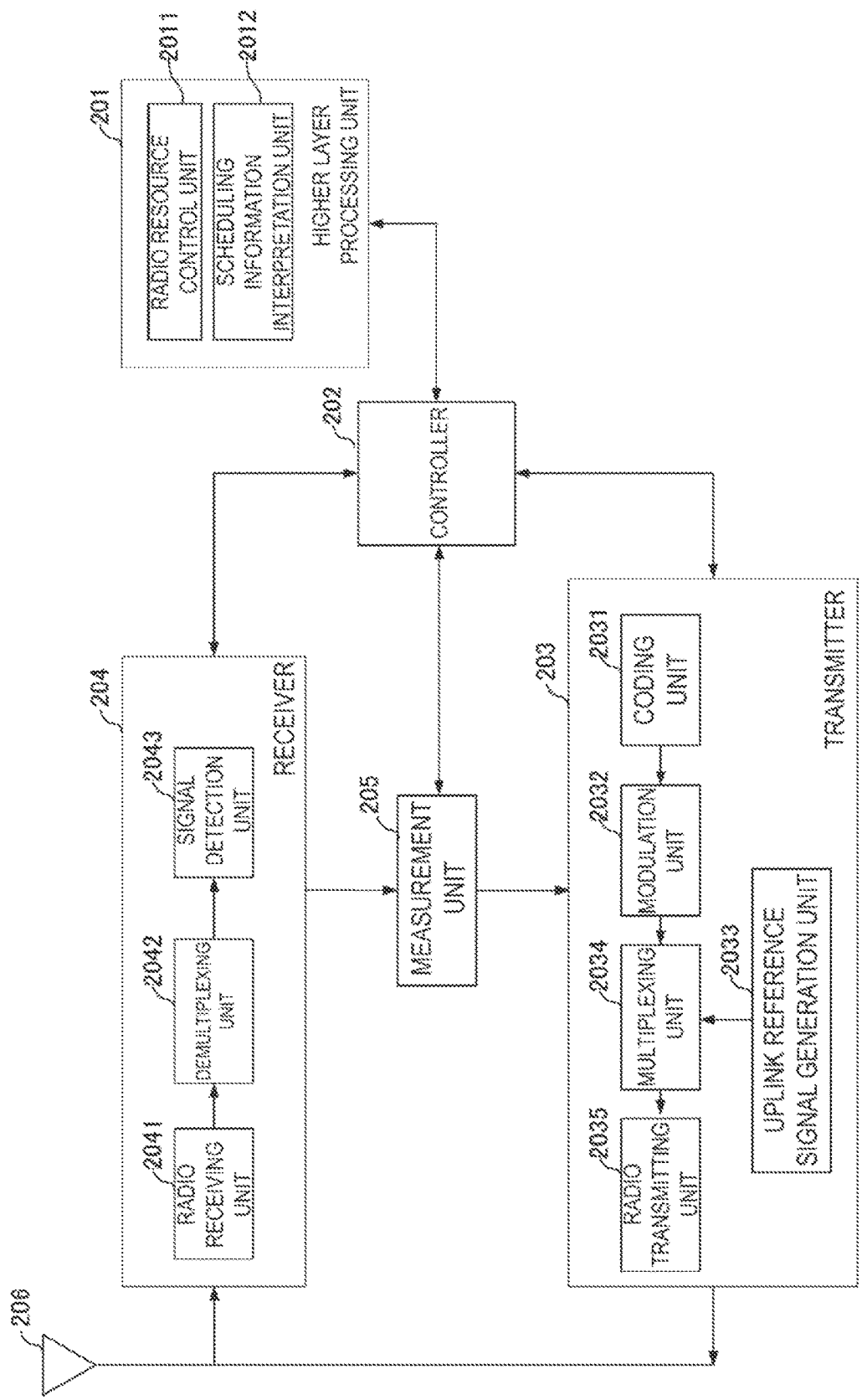
FIG. 3 is a block diagram illustrating a configuration example of a terminal apparatus according to the present embodiment.

FIG. 3 is a schematic block diagram illustrating a configuration of the terminal apparatus according to the present embodiment. As illustrated in FIG. 3, the terminal apparatus includes a higher layer processing unit (higher layer processing step) 201, a controller (controlling step) 202, a transmitter (transmitting step) 203, a receiver (receiving step) 204, a measurement unit (measurement step) 205, and a transmit and/or receive antenna 206. The higher layer processing unit 201 includes a radio resource control unit (radio resource controlling stop) 2011 and a scheduling information interpretation unit (scheduling information interpreting step) 2012. The transmitter 203 includes a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 includes a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A.

Furthermore, the radio resource control unit 2011 manages various configuration information of the terminal apparatuses 2A. The radio resource control unit 2011 generates information to be mapped to each uplink channel, and outputs the generated information to the transmitter 203.

The radio resource control unit 2011 acquires configuration information transmitted from the base station apparatus, and outputs the acquired information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

Based on the information input from the higher layer processing unit 201, the controller 202 generates a control signal for controlling the receiver 204, the measurement unit 205, and the transmitter 203. The controller 202 outputs the generated control signal to the receiver 204, the measurement unit 205, and the transmitter 203 to control the receiver 204 and the transmitter 203.

The controller 202 controls the transmitter 203 so as to transmit the CSI/RSRP/RSRQ/RSSI generated by the measurement unit 205 to the base station apparatus.

In accordance with the control signal input from the controller 202, the receiver 204 demultiplexes, demodulates, and decodes a reception signal received from the base station apparatus through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. The demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043, by using PDSCH and the channel estimation value, performs demodulation and decoding, and outputs the demodulated and decoded signal to the higher layer processing unit 201. In a case that the signal detection unit 2043 cancels or suppresses the interference signal, the signal detection unit 2043 acquires the channel estimation value of the interference channel by using the parameter of the interference signal, and demodulates and decodes the PDSCH.

The measurement unit 205 performs various measurements such as a CSI measurement, a Radio Resource Management (RRM) measurement, a Radio Link Monitoring (RLM) measurement, and the like, and determines the CSI/RSRP/RSRQ/RSSI, and the like.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and/or receive antenna 206.

The coding unit 2031 codes the uplink control information or uplink data input from the higher layer processing unit 201 in compliance with convolutional coding, block coding, turbo coding, LDPC coding, Polar coding, or the like.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence that is determined according to a predetermined rule (formula), based on a physical cell identity (PCI, also referred to as a Cell ID or the like) for identifying the base station apparatus, a bandwidth in which the uplink reference signal is mapped, a cyclic shift notified by using the uplink grant, a parameter value for generation of a DMRS sequence, and the like.

The multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) on a signal resulting from the multiplexing, performs the modulation of OFDM scheme, generates an OFDMA symbol, adds CP to the generated OFDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

Note that the terminal apparatus can perform modulation according to not only an OFDMA scheme but also an SC-FDMA scheme.

Figure 4:
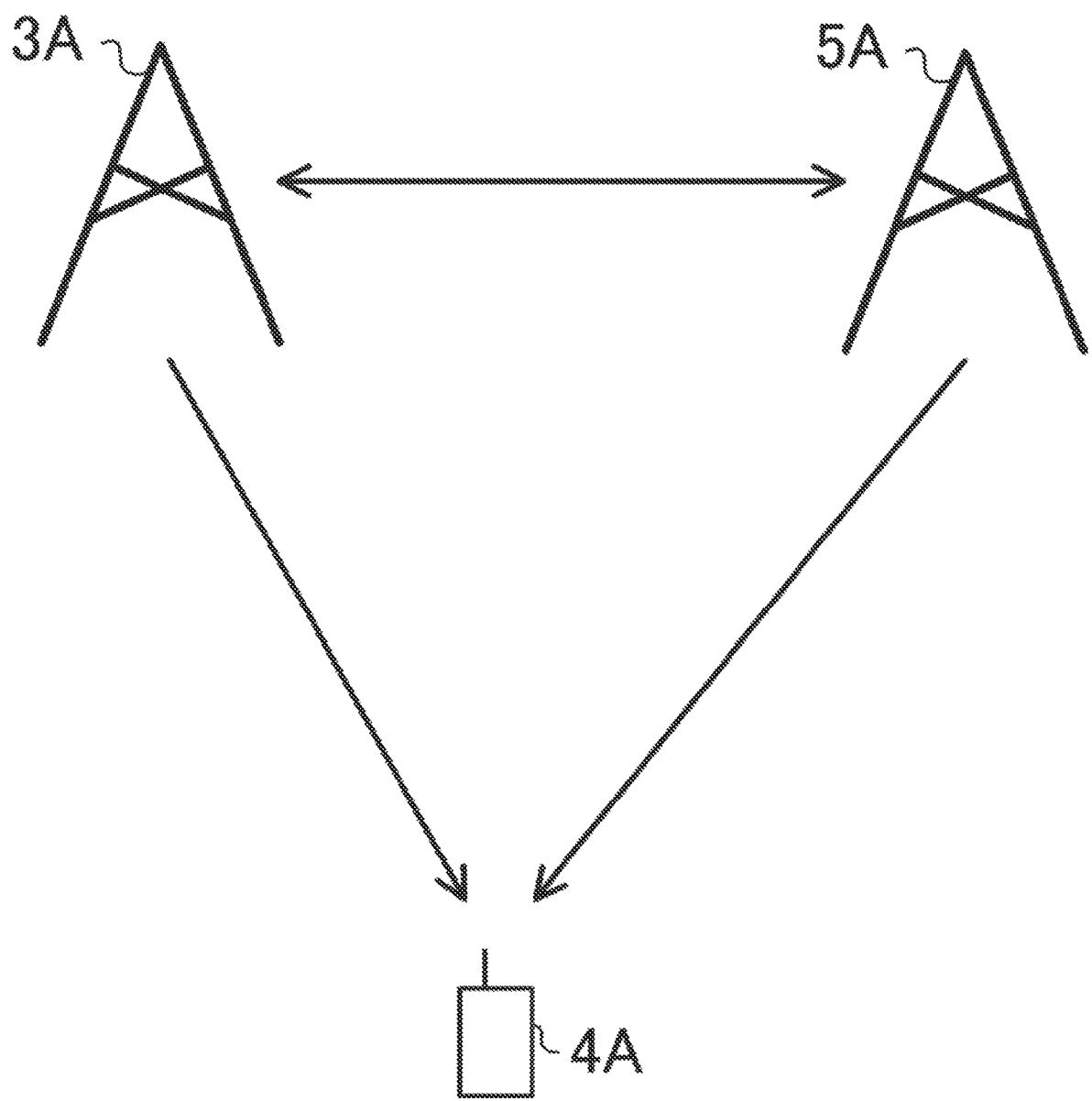
FIG. 4 is a diagram illustrating an example of a communication system according to the present embodiment.

As a technique for increasing system throughput, multi-user Multiple Input Multiple Output (MIMO) transmission that spatially multiplexes multiple terminal apparatuses are effective. FIG. 4 is a diagram illustrating an example of a communication system according to the present embodiment. The communication system illustrated in FIG. 4 includes a base station apparatus 3A and terminal apparatuses 4A and 4B. In a case that the base station apparatus 3A perform multi-user MIMO transmission to the terminal apparatuses 4A and 4B, performance degradation may be caused due to inter-user interference. Note that the terminal apparatuses 4A and 4B are also simply referred to as terminal apparatuses.

In a case that ultra-large capacity communication is required, such as ultra-high definition video transmission, ultra-wideband transmission utilizing high frequency bands is desired. Transmission in the high frequency bands needs to compensate for pathloss and beamforming is important. In an environment in which multiple terminal apparatuses are present in a limited area, an Ultra-dense network with a high density of base station apparatuses located is effective in a case that ultra-large capacity communication is required for each terminal apparatus. However, in a case that the base station apparatuses are located in high density, the Signal to noise power ratio (SNR) greatly improves, but strong interference due to beamforming may arrive. Accordingly, in order to realize ultra-large capacity communication for every terminal apparatus in the limited area, interference control (avoidance, suppression, cancellation) in consideration of beamforming, and/or coordinated communication of multiple base stations are necessary.

FIG. 5 is a diagram illustrating an example of a communication system of the downlink according to the present embodiment. The communication system illustrated in FIG. 5 includes a base station apparatus 3A, a base station apparatus 5A, and a terminal apparatus 4A. The terminal apparatus 4A can use the base station apparatus 3A and/or the base station apparatus 5A as a serving cell. In a case that the base station apparatus 3A or the base station apparatus 5A is provided with a number of antennas, a number of antennas can be divided into multiple subarrays (panels, sub-panels, transmit antenna ports, transmit antenna groups, receive antenna ports, receive antenna groups, antenna groups, and antenna port groups), and transmit/receive beamforming may be applied for each subarray. In this case, each subarray may include a communication apparatus, and the configuration of the communication apparatus is the same as the base station apparatus configuration illustrated in FIG. 2, unless otherwise indicated. In a case that the terminal apparatus 4A includes multiple antennas, the terminal apparatus 4A can transmit or receive by beamforming. In a case that the terminal apparatus 4A is provided with a number of antennas, a number of antennas can be divided into multiple subarrays (panels, sub-panels, transmit antenna ports, transmit antenna groups, receive antenna ports, receive antenna groups, antenna groups, and antenna port groups), and different transmit/receive beamforming may be applied for each subarray. Each subarray may include a communication apparatus, and the configuration of the communication apparatus is the same as the terminal apparatus configuration illustrated in FIG. 3 unless otherwise indicated. Note that the base station apparatus 3A and the base station apparatus 5A are also simply referred to as base station apparatuses. Note that the terminal apparatus 4A is also simply referred to as a terminal apparatus.

A synchronization signal is used to determine a preferable transmit beam of the base station apparatus, and a preferable receive beam for the terminal apparatus. The base station apparatus transmits synchronization signal blocks including the PSS, PBCH, and SSS. Note that, in a synchronization signal block burst set period configured by the base station apparatus, one or more synchronization signal blocks are transmitted in the time domain, and a time index is configured for each synchronization signal block. The terminal apparatus may consider that synchronization signal blocks with the same time index within a synchronization signal block burst set period are transmitted from almost the same location (quasi co-location (QCL)) such that the delay spread, Doppler spread, Doppler shift, average gain, average delay, spatial reception parameters, and/or spatial transmission parameters can be considered to be the same. Note that examples of the spatial reception parameters (Rx parameter, reception filter) include a spatial correlation of the channels, Angle of Arrival, and the receive beam direction. Examples of the spatial transmission parameters include a spatial correlation of the channels, Angle of Departure, and the transmit beam direction. In other words, the terminal apparatus can assume that synchronization signal blocks of the same time index withing the synchronization signal block burst set period are transmitted with the same transmit beam, and that synchronization signal blocks of different time indexes have been transmitted with different beams. Accordingly, in a case that the terminal apparatus reports, to the base station apparatus, information indicating a time index of a preferable synchronization signal block in the synchronization signal block burst set period, the base station apparatus can recognize a transmit beam preferable for the terminal apparatus. The terminal apparatus can determine a receive beam preferable for the terminal apparatus by using synchronization signal blocks of the same time index in different synchronization signal block burst set periods. Thus, the terminal apparatus can associate the time index of the synchronization signal blocks with the receive beam direction and/or subarray. Note that, in a case that the terminal apparatus includes multiple subarrays and connects with different cells, different subarrays may be used. Note that the time index of the synchronization signal block is also referred to as an SSB index or an SSB Resource Indicator (SSBRI).

There are also four QCL types indicative of the state of QCL. The four QCL types are referred to as QCL type A, QCL type B, QCL type C, and QCL type D. The QCL type A is a relationship (state) where Doppler shift, Doppler spread, average delay, and delay spread are QCL. The QCL type B is a relationship (state) where Doppler shift and Doppler spread are QCL. The QCL type C is a relationship (state) where average delay and Doppler shift are QCL. The QCL type D is a relationship (state) in which the spatial reception parameters are QCL. Note that each of the four QCL types can be combined. For example, there may be QCL type A+QCL type D, QCL type B+QCL type D, and the like.

One or more Transmit Configuration Indicator (TCI) states are configured by higher layer signaling. One TCI state can configure the QCL type for one or more downlink signals in a certain cell (cell ID) in a certain bandwidth part (BWP-ID). The downlink signal includes a CSI-RS and SSB. Note that the TCI state is configured by an RRC message (signaling), and one or more of the configured TCI states are activated/deactivated in the MAC layer. The TCI state can be associated with the QCL between the downlink signal and the DMRS of the PDSCH. For example, one or more of the TCI states activated by the DCI may be indicated and used to demodulate (decode) the associated PDSCH. Note that in a case that the QCL type D is configured for the TCI state received in the DCI, the terminal apparatus can recognize the receive beam direction (spatial reception filter) of the associated PDSCH. Therefore, the TCI can be said to be information related to the receive beam direction of the terminal apparatus. The TCI state can be associated with the QCL between the downlink signal and the DMRS of the PDCCH. From the one or more TCI states configured by the RRC message (signaling), one TCI state is activated as a TCI state for the PDCCH in the MAC layer. As a result, the terminal apparatus can recognize the receive beam direction of the PDCCH DMRS. Note that a default receive beam direction of the PDCCH DMRS is associated with the SSB index at the time of initial access.

The CSI-RS can be used to determine a preferable transmit beam of the base station apparatus and a preferable receive beam of the terminal apparatus.

The terminal apparatus receives the CSI-RS in the resource configured by the CSI resource configuration, calculates the CSI or RSRP from the CSI-RS, and reports the CSI or RSRP to the base station apparatus. In a case that the CSI-RS resource configuration includes multiple CSI-RS resource configurations and/or the resource repetition is off, the terminal apparatus receives the CSI-RS in the same receive beam in each CSI-RS resource and calculates the CRI. For example, in a case that the CSI-RS resource set configuration includes K (where K is an integer of 2 or more) CSI-RS resource configurations, the CRI indicates N CSI-RS resources preferable from the K CSI-RS resources. Here, N is a positive integer less than K. In a case that the terminal apparatus reports multiple CRIs, the terminal apparatus can report the CSI-RSRP measured by each CSI-RS resource to the base station apparatus in order to indicate which CSI-RS resource is good in quality. Transmitting, by the base station apparatus, the CSI-RS by beamforming (precoding) in different beam directions in the multiple configured CSI-RS resources, allows for the base station apparatus to recognize the transmit beam direction of the base station apparatus preferable for the terminal apparatus by the CRI reported from the terminal apparatus. Meanwhile, the preferable receive beam direction of the terminal apparatus can be determined by the transmit beam of the base station apparatus using a fixed CSI-RS resource. For example, in a case that the CSI-RS resource configuration includes multiple CSI-RS resource configurations and/or the resource repetition is on, the terminal apparatus can determine a preferable receive beam direction from the CSI-RS received in each different receive beam direction in each CSI-RS resource. Note that the terminal apparatus may report the CSI-RSRP after determining a preferable receive beam direction. Note that in a case that the terminal apparatus includes multiple subarrays, the terminal apparatus can select a preferable subarray in determining a preferable receive beam direction. Note that a preferable receive beam direction of the terminal apparatus may be associated with a CRI (or CSI-RS resource ID). In a case that the terminal apparatus reports multiple CRIs, the base station apparatus can fix the transmit beam with the CSI-RS resource associated with each CRI (or CSI-RS resource ID). At this time, the terminal apparatus can determine a preferable receive beam direction for each CRI (or CSI-RS resource ID). For example, the base station apparatus can transmit a downlink signal/channel and a CRI (or CSI-RS resource ID) in association with each other. At this time, the terminal apparatus needs to receive a receive beam associated with the CRI. In the multiple CSI-RS resources configured, different base station apparatuses can transmit the CSI-RS. In this case, it is possible for the network side to recognize of which base station apparatus the communication quality is good by the CRI (or CSI-RS resource ID). In a case that the terminal apparatus includes multiple subarrays, the terminal apparatus can receive using the multiple subarrays at the same timing. Accordingly, in a case that the base station apparatus transmits the CRI (or CSI-RS resource ID) in association with each of multiple layers (codeword, transport block) by using downlink control information or the like, the terminal apparatus can receive at multiple layers by using a subarray and a receive beam corresponding to each CRI (or CSI-RS resource ID). However, in a case that an analog beam is used, and one receive beam direction is used at the same timing in one subarray, and in a case that two CRIs (or CSI-RS resource IDs) corresponding to one subarray of the terminal apparatus are simultaneously configured, the terminal apparatus may fail to receive at multiple receive beams. To avoid this problem, for example, the base station apparatus groups the multiple CSI-RS resources configured, and the CRI is determined in a group by using the same subarray. In a case that different subarrays are used between groups, the base station apparatus can recognize multiple CRIs that can be configured at the same timing. Note that the CSI-RS resource group may be a CSI-RS resource configured with a CSI resource configuration or a CSI-RS resource set configuration. Note that the CRI (or CSI-RS resource ID) that can be configured at the same timing may be considered to be QCL. At this time, the terminal apparatus can transmit the CRI (or CSI-RS resource ID) in association with the QCL information. The QCL information is information about QCL for a prescribed antenna port, a prescribed signal, or a prescribed channel. In a case that, in two antenna ports, long term performance of a channel on which a symbol on one antenna port is carried can be estimated from a channel on which a symbol on the other antenna port is carried, the two antenna ports are said to be quasi co-located (in a QCL state). The long term performance includes at least one of a delay spread, a Doppler spread, a Doppler shift, an average gain, an average delay, a spatial reception parameter, and/or a spatial transmission parameter. For example, in a case that two antenna ports are quasi co-located (in a QCL state), the terminal apparatus can consider the two antenna ports to have the same long term performance. For example, in a case that the terminal apparatus reports CRI that is QCL for the spatial reception parameters and CRI that is not QCL for the spatial reception parameters in a distinguishing manner, the base station apparatus is able to not to configure the CRI that is QCL for the spatial reception parameters to the same timing, but configure the CRI that is not QCL for the spatial reception parameters to the same timing. The base station apparatus may request CSI for each subarray of the terminal apparatus. In this case, the terminal apparatus reports CSI for each subarray. Note that, in a case that the terminal apparatus reports multiple CRIs to the base station apparatus, only CRI that is not QCL may be reported.

In order to determine a preferable transmit beam of the base station apparatus, a codebook is used in which candidates for a prescribed precoding (beamforming) matrix (vector) are defined. The base station apparatus transmits the CSI-RS, and the terminal apparatus determines a preferable precoding (beamforming) matrix from the codebook, and reports the matrix as PMI to the base station apparatus. Thereby, the base station apparatus can recognize a preferable transmit beam direction for the terminal apparatus. Note that the codebook includes precoding (beamforming) matrices for combining antenna ports and precoding (beamforming) matrices for selecting an antenna port. In a case of using a codebook for selecting the antenna port, the base station apparatus may use different transmit beam directions for antenna ports. Accordingly, in a case that the terminal apparatus reports a preferable antenna port as PMI, the base station apparatus can recognize a preferable transmit beam direction. Note that a preferable receive beam of the terminal apparatus may be the receive beam direction associated with the CRI (or CSI-RS resource ID), or the terminal apparatus may determine a preferable receive beam direction again. In the case of using the codebook for selecting the antenna port, and that a preferable receive beam direction for the terminal apparatus is the receive beam direction associated with the CRI (or CSI-RS resource ID), it is desirable that the receive beam direction for receiving the CSI-RS is the receive beam direction associated with the CRI (or CSI-RS resource ID) to receive. Note that even in a case that the receive beam direction associated with the CRI (or CSI-RS resource ID) is used, the terminal apparatus can associate the PMI with the receive beam direction. In the case of using the codebook for selecting the antenna port, each antenna port may be transmitted from different base station apparatuses (cells). In this case, in a case that the terminal apparatus reports the PMI, the base station apparatus can recognize with which base station apparatus (cell) communication quality is preferable. Note that in this case, the antenna ports of different base station apparatuses (cells) may not be QCL.

In order to improve reliability and increase frequency efficiency, coordinated communication of multiple base station apparatuses (transmission and/or reception points) can be performed. The coordinated communication of multiple base station apparatuses (transmission and/or reception points) include, for example, Dynamic Point Selection (DPS) for dynamically switching a preferable base station apparatus (transmission and/or reception point), Joint Transmission (JT), in which the same or different data signals are transmitted from multiple base station apparatuses (transmission and/or reception points), and the like. In a case that the same data is transmitted from multiple base station apparatuses (transmission and/or reception points), reliability can be improved, and in a case that different data is transmitted from multiple base station apparatuses (transmission and/or reception points), frequency efficiency and throughput can be improved. In a case that the terminal apparatus communicates with multiple base station apparatuses, the terminal apparatus may communicate by using multiple subarrays. For example, in a case that the terminal apparatus 4A communicates with the base station apparatus 3A, the subarray 1 may be used, and in a case that the terminal apparatus 4A communicates with the base station apparatus 5A, the subarray 2 may be used. In a case that the terminal apparatus is in coordinated communication with multiple base station apparatuses, the terminal apparatus may dynamically switch multiple subarrays or transmit and/or receive using multiple subarrays at the same timing. At this time, it is desirable that the terminal apparatus 4A and the base station apparatus 3A/5A share information related to subarrays of the terminal apparatuses used for the communication.

The terminal apparatus can include CSI configuration information in the CSI report. For example, the CSI configuration information may include information indicating a subarray. For example, the terminal apparatus may transmit a CSI report including an index indicating CRI (or CSI-RS resource ID) and a subarray. In this way, the base station apparatus can associate the transmit beam direction with the subarray of the terminal apparatus. Alternatively, the terminal apparatus may transmit a CRI report including multiple CRIs (or CSI-RS resource IDs). In this case, in a case that it is prescribed that some of the multiple CRIs (or CSI-RS resource IDs) are associated with the subarray 1 and the rest of the CRIs (or CSI-RS resource IDs) are associated with the subarray 2, the base station apparatus can associate the index indicating the subarray with the CRI (or CSI-RS resource ID). The terminal apparatus can perform joint coding on the CRI (or CSI-RS resource ID) and the index indicating the subarray to transmit the CRI report in order to reduce the control information. In this case, of the N (N is an integer of 2 or more) bits indicating CRI, one bit indicates subarray 1 or subarray 2, and the remaining bits indicate CRI. Note that, in a case of joint coding, one bit is used for an index indicating a subarray, so the number of bits that can represent the CRI is reduced. Thus, in a case that the terminal apparatus reports the CSI report including an index indicating a subarray, and that the number of CSI-RS resources indicated by the CSI resource configuration is greater than the number capable of representing the CRI, the terminal apparatus can determine the CRI from some of CSI-RS resources. Note that in different CSI resource configurations, in a case that the CSI is determined to be calculated in different subarrays, the base station apparatus can recognize the CSI for each subarray of the terminal in a case that the terminal apparatus transmits CSI calculated by subarrays different for each resource configuration ID.

The CSI configuration information can include configuration information for the CSI measurement. For example, the configuration information for the CSI measurement may be a measurement link configuration or other configuration information. As a result, the terminal apparatus can associate the configuration information for the CSI measurement with the subarray and/or the receive beam direction. For example, in a case of considering coordinated communication with two base station apparatuses (e.g., base station apparatuses 3A and 5A), it is desirable that there are several types of configuration information. Suppose that a configuration of the CSI-RS for channel measurement transmitted by the base station apparatus 3A is set as resource configuration 1, and a configuration of the CSI-RS for channel measurement transmitted by the base station apparatus 5A is set as resource configuration 2. In this case, the configuration information 1 may be the resource configuration 1, the configuration information 2 may be the resource configuration 2, and the configuration information 3 may be the resource configuration 1 and the resource configuration 2. Note that each of the configuration information may include a configuration of the interference measurement resource. In a case that the CSI measurement is performed based on configuration information 1, the terminal apparatus can measure CSI in the CSI-RS transmitted from the base station apparatus 3A. In a case that the CSI measurement is performed based on configuration information 2, the terminal apparatus can measure the CSI transmitted from the base station apparatus 5A. In a case that the CSI measurement is performed based on configuration information 3, the terminal apparatus can measure CSI in the CSI-RS transmitted from the base station apparatus 3A and the base station apparatus 5A. The terminal apparatus can associate the subarray and/or the receive beam direction used for the CSI measurement with respect to each of the configuration information 1 to 3. Accordingly, the base station apparatus can indicate a preferable subarray and/or receive beam direction used by the terminal apparatus by indicating the configuration information 1 to 3. Note that in a case that the configuration information 3 is configured, the terminal apparatus determines the CSI for the resource configuration 1 and/or CSI for the resource configuration 2. At this time, the terminal apparatus can associate the subarray and/or the receive beam direction for each of the resource configuration 1 and/or the resource configuration 2. It is also possible to associate the resource configuration 1 and/or the resource configuration 2 with a codeword (transport block). For example, the CSI for the resource configuration 1 can be the CSI of a codeword 1 (transport block 1), and the CSI for the resource configuration 2 can be the CSI of a codeword 2 (transport block 2). The terminal apparatus can determine one CSI in consideration of the resource configuration 1 and the resource configuration 2. However, even in a case that one CSI is required, the terminal apparatus can associate the subarray and/or the receive beam direction for each of the resource configuration 1 and the resource configuration 2.

In a case that multiple resource configurations are configured (for example, in a case that the configuration information 3 described above is configured), the CSI configuration information may include information indicating whether the CSI includes one CRI or includes CRI for each of the multiple resource configurations. In a case that the CSI includes one CRI, the CSI configuration information may include a resource configuration ID by which CRI has been calculated. According to the CSI configuration information, the base station apparatus can recognize on which assumption the terminal apparatus has calculated CSI or of which resource configuration the received quality is good.

The base station apparatus can transmit a CSI request to request a CSI report to the terminal apparatus. The CSI request can include reporting CSI for one subarray or reporting CSI for multiple subarrays. In this case, in a case that the terminal apparatus is required to report CSI for one subarray, the terminal apparatus transmits a CSI report not including the index indicating the subarray. In a case that the CSI for the multiple subarrays is required to be reported, the terminal apparatus transmits a CSI report including the indexes indicating the subarrays. Note that, in a case that the base station apparatus requests the CSI report for one subarray, the base station apparatus can indicate the subarray for which CSI is to be calculated by the terminal apparatus, by using an index or a resource configuration ID indicating the subarray. In this case, the terminal apparatus calculates the CSI for the subarray indicated by the base station apparatus.

The base station apparatus can transmit a CSI request including configuration information for the CSI measurement. In a case that the CSI request includes configuration information for the CSI measurement, the terminal apparatus determines the CSI based on the configuration information for the CSI measurement. The terminal apparatus may report CSI to the base station apparatus, but may not report the configuration information for the CSI measurement.

The terminal apparatus and the base station apparatus according to the present embodiment can configure new virtual antenna ports in order to select a preferable subarray. The virtual antenna ports are each associated with a physical subarray and/or a receive beam. The base station apparatus can notify the terminal apparatus of the virtual antenna ports, and the terminal apparatus can select a subarray for receiving the PDSCH. The virtual antenna ports can be configured with QCL. The base station apparatus can notify multiple terminal apparatuses of the virtual antenna ports. In a case that the notified virtual antenna ports are QCL, the terminal apparatus may receive the associated PDSCH by using one subarray, and in a case that the notified virtual antenna ports are not QCL, the terminal apparatus may receive the associated PDSCH by using two or more subarrays. The virtual antenna ports can be associated with any one or more of a CSI-RS resource, a DMRS resource, and an SRS resource. By configuring the virtual antenna ports, the base station apparatus can configure a subarray in a case that the terminal apparatus transmits the RS with the resource in any one or more of the CSI-RS resource, the DMRS resource, and the SRS resource.

In a case that multiple base station apparatuses performs coordinated communication, it is desirable for the terminal apparatus to receive using the subarrays and/or receive beam directions preferable for the PDSCH transmitted by each base station apparatus. Thus, the base station apparatus transmits information for the terminal apparatus to receive using a preferable subarray and/or receive beam direction. For example, the base station apparatus can transmit CSI configuration information or information indicating CSI configuration information in the downlink control information. In a case that the terminal apparatus receives the CSI configuration information, the terminal apparatus can receive using the subarray and/or the receive beam direction associated with the CSI configuration information.

For example, the base station apparatus can transmit information indicating the subarray and/or the receive beam direction as the CSI configuration information. Note that the CSI configuration information may be transmitted in a prescribed DCI format. The information indicating the receive beam direction may be the time index of the CRI (or CSI-RS resource ID), the PMI, or the synchronization signal block. The terminal apparatus can recognize the preferable subarray and/or the receive beam direction from the received DCI. Note that the information indicating the subarray is expressed as one bit or two bits. In a case that the information indicating the subarray is indicated by one bit, the base station apparatus may indicate the subarray 1 or the subarray 2 by "0" or "1" to the terminal apparatus. In a case that the information indicating the subarray is indicated by two bits, the base station apparatus may indicate the terminal apparatus to switch subarrays and receive using two subarrays. Note that in different resource configurations, in a case that the CSI is determined to be calculated for different subarrays, the base station apparatus can indicate the subarray of the terminal apparatus by transmitting the DCI including the resource configuration ID.

For example, the base station apparatus can transmit configuration information for the CSI measurement as CSI configuration information. In this case, the terminal apparatus can receive the PDSCH using the subarray and/or the receive beam direction associated with the CSI fed back by the configuration information of the received CSI measurement. Note that in a case that the configuration information for the CSI measurement indicates the configuration information 1 or the configuration information 2, the CSI configuration information indicates that the PDSCH transmission is associated with one resource configuration information. In a case that the configuration information for the CSI measurement indicates the configuration information 3, the CSI configuration information indicates that the PDSCH transmission is associated with multiple pieces of resource configuration information.

The CSI configuration information may be associated with a parameter (field) included in the DCI, such as a DMRS Scrambling identity (SCID). For example, the base station apparatus can configure the association of the SCID and the configuration information for the CSI measurement. In this case, the terminal apparatus can refer to the configuration information for the CSI measurement from the SCID included in the DCI, and can receive the PDSCH using the subarray and/or the receive beam direction associated with the configuration information for the CSI measurement.

The base station apparatus can configure two DMRS antenna port groups. The two DMRS port groups are also referred to as DMRS port group 1 (first DMRS port group), and DMRS port group 2 (second DMRS port group). The antenna ports in the DMRS antenna port group are QCL, and the antenna ports between the DMRS antenna port groups are not QCL. Accordingly, in a case that the DMRS antenna port group and the subarray of the terminal apparatus are associated with each other, the base station apparatus can indicate the subarray of the terminal apparatus with the DMRS antenna port number included in the DCI. For example, in a case that the DMRS antenna port number included in the DCI is included in one DMRS antenna port group, the terminal apparatus receives using one subarray corresponding to the DMRS antenna port group. In a case that the DMRS antenna port number included in the DCI is included in both the two DMRS antenna port groups, the terminal apparatus receives using two subarrays. One DMRS antenna port group may be associated with one codeword (transport block). The relationship between the DMRS antenna port group and the index of the codeword (transport block) may be predetermined or may be indicated by the base station apparatus.

Note that in different resource configurations, in a case that the CSI is determined to be calculated for different subarrays, and that the DMRS antenna port group is associated with the resource configuration ID or CSI-RS resource, by the DMRS antenna port included in the DCI, the terminal apparatus can identify the resource configuration ID or the CSI-RS resource, and can recognize the subarray and/or the receive beam direction.

The base station apparatus can configure the DMRS antenna port group and CSI configuration information in association with each other. Note that in a case that the CSI configuration information includes the configuration information for the CSI measurement and the configuration information for the CSI measurement indicates the configuration information 3, the terminal apparatus demodulates using the subarray and/or receive beam direction corresponding to the resource configuration 1 for the DMRS antenna port included in the DMRS antenna port group 1, and the terminal apparatus demodulates using the subarray and/or receive beam direction corresponding to the resource configuration 2 for the DMRS antenna port included in the DMRS antenna port group 2.

In a case that the report amount is configured to the CRI/RSRP or SSBRI/RSRP in the CSI report configuration, and that the group based beam reporting is configured to be off, the terminal apparatus reports one, two, or four different CRIs or SSBRIs in one report. In a case that the report amount is configured to the CRI/RSRP or SSBRI/RSRP in the CSI report configuration, and that the group based beam reporting is configured to be on, the terminal apparatus reports two different CRIs or SSBRIs in one report. However, the two CSI-RS resources or the two SSB can be received simultaneously by one spatial domain reception filter or multiple spatial domain reception filters.

In a case that the report amount is configured to the CRI, RI, or CQI in the CSI report configuration, and in a case that the group based beam reporting is configured to be on, the terminal apparatus determines the CSI based on two CSI-RS resources that can be received simultaneously by one spatial domain reception filter (panel, subarray) or multiple spatial domain reception filters (panels, subarrays). The two CSI-RS resources are referred to as a first CSI-RS resource and a second CSI-RS resource, respectively. The CRI indicating the first CSI-RS resource is also referred to as a first CRI, and the CRI indicating the second CSI-RS resource is also referred to as a second CRI. The RI determined by the first CSI-RS resource is also referred to as a first RI, and the RI determined by the second CSI-RS resource is also referred to as a second RI. Note that in a case that the RI is equal to or less than four (four layers), the number of codewords is one, and in a case that the RI is greater than four, the number of codewords is two. Accordingly, the CSI reported by the terminal apparatus may vary depending on whether the total of the first RI and the second RI is equal to or less than four, or greater than four. In a case that the total of the first RI and the second RI is equal to or less than four, the CQI determined in consideration of both the first CSI-RS and the second CSI-RS is determined. At this time, the terminal apparatus reports the CQI determined in consideration of the first CRI, the second CRI, the first RI, the second RI, and both of the first CSI-RS and the second CSI-RS as CSI. In a case that the total of the first RI and the second RI is greater than four, the first CQI determined by the first CSI-RS and the second CQI determined by the second CSI-RS are determined. At this time, the terminal apparatus reports the first CRI, the second CRI, the first RI, the second RI, the first CQI, and the second CQI as CSI.

In a case that the report amount is configured to the CRI, RI, PMI, or CQI in the CSI report configuration, and that the group based beam reporting is configured to be on, the terminal apparatus determines the CSI, based on two CSI-RS resources that can be received simultaneously by one spatial domain reception filter or multiple spatial domain reception filters. The PMI for the first CSI-RS resource is also referred to as the first PMI, and the PMI for the second CSI-RS resource is also referred to as the second PMI. Note that the first PMI and the second PMI may be determined in consideration of both of the first CRI and the second CRI. In this case, the first PMI and the second PMI for which interference between each other is considered is determined. Note that PMI is divided into PMI-1 and PMI-2 in a case that the CSI-RS is equal to or greater than four antenna ports. The PMI-1 is wideband information, and indicates a codebook index that is determined based at least on N1 and N2. Note that the number of antenna ports of the CSI-RS is represented by 2N1N2. Note that N1 and N2 are both integers of 1 or greater, and N1 represents the number of antenna ports in the first dimension (e.g., horizontal direction), and N2 represents the number of antenna ports in the second dimension (e.g., vertical direction). The number of polarization antennas is two. The PMI-1 includes one or more pieces of information depending on the values of N1 and N2, or the RI (the number of layers). The PMI-2 is wideband or subband information, and indicates at least the phase rotation. Note that the PMI-1 and the PMI-2 determined by the first CSI-RS resource are also referred to as a first PMI-1 and a first PMI-2, respectively. The PMI-1 and the PMI-2 determined by the second CSI-RS resource are also referred to as a second PMI-1 and a second PMI-2, respectively. Note that the report amount may be configured with the CRI, RI, PMI-1, and CQI. Note that the CRI, RI, and CQI are the same as the case that the report amount is configured with the CRI, RI, and CQI. Therefore, in a case that the total of the first RI and the second RI is equal to or less than four, the terminal apparatus reports the CQI determined in consideration of the first CRI, the second CRI, the first RI, the second RI, the first PMI (PMI-1), the second PMI (PMI-1), and both of the first CSI-RS and the second CSI-RS as CSI. In a case that the total of the first RI and the second RI is greater than four, the terminal apparatus reports the first CRI, the second CRI, the first RI, the second RI, the first PMI (PMI-1), the second PMI (PMI-1), the first CQI, and the second CQI as CSI.

Note that in a case that the total of the first RI and the second RI is greater than four, the number of layers of the number of codewords 1 is the same as or smaller than the number of layers with of the number of codewords 2, so the first RI is the same as or smaller than the second RI. In other words, in a case that the RI is reported, the first CRI or the second CRI is determined by the value of RI rather than the one with better received power (RSRP)/received quality (RSRQ) is the first CRI. In a case that the number of layers of the codeword 1 and the number of layers of the codeword 2 are different, the difference is 1. In other words, in a case that the total of the first RI and the second RI is five, the first RI is two and the second RI is three. In a case that the total of the first RI and the second RI is six, the first RI is three and the second RI is three. In a case that the total of the first RI and the second RI is seven, the first RI is three and the second RI is four. In a case that the total of the first RI and the second RI is eight, the first RI is four and the second RI is four. In a case that the difference between the first RI and the second RI is greater than one, the terminal apparatus may report the CSI of either the first CRI or the second CRI, for example, the one with greater value of RI. Since there is the rule described above, the terminal apparatus may report the total value of the first RI and the second RI without reporting the first RI and the second RI separately. Note that in a case that the group based beam reporting is configured to be on, and that the report amount is configured to the CRI, RI, CQI or CRI, RI, PMI (PMI-1), and CQI, the first CRI and the second CRI may be different codewords. At this time, the CQI is reported with the first CQI and the second CQI. However, the total of the first RI and the second RI is equal to or less than eight, and an RI in one CRI is equal to or less than four. Note that in a case that the first CRI and the second CRI are different codewords, the terminal apparatus may be indicated from the base station apparatus. Note that, even in the case that the first CRI and the second CRI are different codewords, in a case that the number of layers of the codeword 1 and the number of layers of the codeword 2 are different, the difference may be 1. At this time, in a case that the total of the first RI and the second RI is four, the first RI is two and the second RI is two. In a case that the total of the first RI and the second RI is three, the first RI is one and the second RI is two. In a case that the total of the first RI and the second RI is two, the first RI is one and the second RI is one.

The priority of the CSI report is configured to be higher for the CRI where the RI is greater. In other words, in the present embodiment, the second CRI has higher priority than that of the second CRI. For example, in a case that the amount of information of the PUCCH is insufficient, the second CRI and the RI/PMI/CQI determined by the second CRI is reported, and the first CRI and the RI/PMI/CQI determined by the first CRI are dropped. Note that in a case that CQI is reported in either one of the CRIs, the CQI determined by one CRI is reported even in a case that the total of the first RI and the second RI is equal to or less than four.

In a case that the CSI is reported in the PUSCH, or in a case that the subband CSI is reported in the PUCCH, the CSI is divided into two parts and reported. The two parts are also referred to as a first part (Part 1, CSI part 1), and a second part (Part 2, CSI part 2). Note that the priority of the CSI report is higher in the first part than in the second part. For example, in a case that the RI is less than or equal to four, the first part includes some or all of the total of the first RI and the second RI (or second RI), the second CRI, and the CQI based on the first CRI and the second CRI (or the second CQI). The second part includes some or all of the first CRI, the first RI, the first CQI, the first PMI, and the second PMI. In a case that the RI is greater than four, the first part includes some or all of the total of the first RI and the second RI (or second RI), the second CRI, and the second CQI. The second part includes some or all of the first CRI, the first RI, the first CQI, the first PMI, and the second PMI. Note that the CSI may be divided into three parts. The third part is also referred to as a third part (Part 3, CSI part 3). The third part has a lower priority than that of the second part. At this time, the first part includes some or all of the total of the first RI and the second RI (or second RI), the second CRI, and the CQI based on the first CRI and the second CRI (or the second CQI). The second part includes some or all of the first CRI, the first RI, and the first CQI. The third part includes some or all of the first PMI and the second PMI.

Note that the terminal apparatus may divide and report each of the CSI based on the first CRI and the CSI based on the second CRI in two parts. Note that the two parts of the CSI based on the first CRI are also referred to as a first part 1 and a first part 2. The two parts of the CSI based on the second CRI are also referred to as a second part 1 and a second part 2. Note that the first part 1 includes some or all of the first CRI, the first RI, and the first CQI. The first part 2 includes the first PMI. The second part 1 includes some or all of the second CRI, the second RI, and the second CQI. The second part 2 includes the second PMI. Note that the priority of CSI can be configure high in order of the second part 1, the first part 1, the second part 2, and the first part 2. At this time, the terminal apparatus reports CSI having a long period (small variation) in the second CRI and the first CRI, and the base station apparatus and the terminal apparatus can communicate by using minimum parameters for the first CRI and the second CRI. The priority of CSI can be configured high in order of the second part 1, the second part 2, the first part 1, and the first part 2. At this time, by the terminal apparatus preferentially reporting the complete CSI in the second CRI, the base station apparatus and the terminal apparatus can communicate by using detailed parameters related to the second CRI.

Note that in a case that the first RI and the second RI are equal to or less than four, and the first CRI and the second CRI are separate codewords, the terminal apparatus reports information indicating that both or one of the CSI based on the first CRI and the CSI based on the second CRI are reported. Note that information indicating that both or one of the CSI based on the first CRI and the CSI based on the second CRI are reported is included in the first part of the CSI. Note that information indicating that both or one of the CSI based on the first CRI and the CSI based on the second CRI are reported may indicate whether or not the first CRI is included in the second part of the CSI.

The DMRS for the PDSCH or the PUSCH is configured with a DMRS configuration type 1 (first DMRS configuration type) or a DMRS configuration type 2 (second DMRS configuration type). The DMRS configuration type 1 supports up to eight DMRS antenna ports, and the DMRS configuration type 2 supports up to 12 DMRS antenna ports. The DMRS is multiplexed by Code Division Multiplexing (CDM) with Orthogonal Cover Code (OCC). The OCC has a code length of up to 4 and has a length of 2 in the frequency direction and a length of 2 in the time direction. The front-loaded DMRS is mapped at one symbol or two symbols. In a case that the front-loaded DMRS is one symbol, the DMRS cannot be multiplexed in the time direction, so the DMRS is only multiplexed in the frequency direction. This case may be referred to as OCC=2. Up to four DMRS antenna ports are multiplexed by CDM in the OCC. Note that the four DMRS antenna ports to be multiplexed by CDM is also referred to as a CDM group (DMRS CDM group). In this case, the DMRS configuration type 1 includes two CDM groups, and the DMRS configuration type 2 includes three CDM groups. The DMRSs of different CDM groups are mapped to orthogonal resources. Note that the two CDM groups of the DMRS configuration type 1 are also referred to as CDM group 0 (first CDM group) and CDM group 1 (second CDM group). Three CDM groups of the DMRS configuration 2 are also referred to as CDM group 0 (first CDM group), CDM group 1 (second CDM group), and CDM group 2 (third CDM group). For the DMRS configuration type 1, the CDM group 0 includes DMRS antenna ports 1000, 1001, 1004, and 1005, and the CDM group 1 includes DMRS antenna ports 1002, 1003, 1006, and 1007. For the DMRS configuration type 2, the CDM group 0 includes DMRS antenna ports 1000, 1001, 1006, and 1007, the CDM group 1 includes DMRS antenna ports 1002 1003, 1008, and 1009, and the CDM group 2 includes DMRS antenna ports 1004, 1005, 1010, and 1011. Note that the CDM group associated with the DMRS is also referred to as a DMRS CDM group.

The DMRS antenna port number for the PDSCH or PUSCH and the number of DMRS CDM groups without data are indicated by DCI. The terminal apparatus can recognize the number of DMRS antenna ports by the number of indicated DMRS antenna port numbers. The number of DMRS CDM groups without data indicates that no PDSCH is allocated for resources on which the DMRSs of the associated CDM group are mapped. Note that in a case that the number of DMRS CDM groups without data is one, the CDM group to be referenced is the CDM group 0, and in a case that the number of DMRS CDM groups without data is two, the CDM group to be referenced is the CDM group 0 and the CDM group 1, and in a case that the number of DMRS CDM groups without data is three, the CDM group to be referenced is the CDM group 0, the CDM group 1, and the CDM group 2.

Note that, for example, in a case of transmission of Multi User-Multiple Input Multiple Output (MU-MIMO), the DMRS for the PDSCH or PUSCH can be different in power from the PDSCH. For example, it is assumed that the base station apparatus has spatially multiplexed and transmitted four layers of PDSCH for each of two terminal apparatuses. In other words, the base station apparatus spatially multiplexes and transmits a total of eight layers of PDSCH. In this case, the base station apparatus indicates the DMRS antenna port numbers of the CDM group 0 to one terminal apparatus, and indicates the DMRS antenna port numbers of the CDM group 1 to another terminal apparatus. The base station apparatus indicates that the number of DMRS CDM groups without data is two to the two terminal apparatuses. At this time, the spatial multiplexing order of the DMRS is four, while the spatial multiplexing order of the PDSCH is eight, and the power ratio (offset) between the DMRS and the PDSCH is twice (different by 3 dB). For example, it is assumed that the base station apparatus has spatially multiplexed and transmitted four layers of PDSCH for each of three terminal apparatuses. In other words, the base station apparatus spatially multiplexes and transmits a total of 12 layers of PDSCH. In this case, the base station apparatus indicates the three terminal apparatuses with the DMRS antenna port numbers of the CDM group 0, the CDM group 1, and the CDM group 2 m respectively. The base station apparatus indicates that the number of DMRS CDM groups without data is three to the three terminal apparatuses. At this time, the spatial multiplexing order of the DMRS is four, while the spatial multiplexing order of the PDSCH is 12, and the power ratio between the DMRS and the PDSCH is three times (different by 4.77 dB). Accordingly, the base station apparatus or the terminal apparatus transmits the DMRS and PDSCH in consideration of the power ratio of the DMRS and the PDSCH for several times of the number of CDM groups. The base station apparatus or the terminal apparatus demodulates (decodes) the PDSCH in consideration of the power ratio of the DMRS and the PDSCH for several times of the CDM groups. Note that the power ratio of the DMRS and the PDSCH of several times for the CDM groups is considered in the case of Single user MIMO (SU-MIMO) transmission with a large spatial multiplexing order.

However, in a case that the terminal apparatus communicates with multiple base station apparatuses (transmission and/or reception points), the power ratio of the DMRS and the PDSCH may be different from those described above. For example, in a case that the terminal apparatus communicates with two base station apparatuses (transmission and/or reception points), it is assumed that four layers of PDSCH are spatially multiplexed and transmitted from each of the base station apparatuses. In this case, the number of DMRS CDM groups without data is indicated to be 2 from one of the base station apparatuses or two base station apparatuses. However, since the spatial multiplexing order of the DMRS and the spatial multiplexing order of the PDSCH transmitted from each of the base station apparatuses are four, the power ratio of the DMRS and the PDSCH is one 1 (0 dB), and the power ratio between the DMRS and the PDSCH need not be considered. Accordingly, the terminal apparatus needs to recognize (determine) whether or not to demodulate (decode) the PDSCH in consideration of the power ratio of the DMRS and the PDSCH. Note that in a case that the terminal apparatus communicates with multiple base station apparatuses (transmission and/or reception points), each of the base station apparatuses (transmission and/or reception points) may transmit by reducing the power of the PDSCH according to the number of DMRS CDM groups without data. However, in this case, the reliability and reliability decrease.

The base station apparatus can transmit, to the terminal apparatus, the power ratio of the DMRS and the PDSCH or information indicating whether or not to demodulate (decode) the PDSCH in consideration of the power ratio of the DMRS and the PDSCH. In this case, the terminal apparatus can demodulate (decode) the PDSCH in accordance with the received power ratio of the DMRS and the PDSCH or the information indicating whether or not to demodulate (decode) the PDSCH in consideration of the power ratio of the DMRS and the PDSCH.

The terminal apparatus can determine the power ratio of the DMRS and the PDSCH from the configuration of the DMRS port group. For example, in the DMRS configuration type 1, suppose that the DMRS port group 1 is configured (associated) with the CDM group 0, that is, the DMRS ports 1000, 1001, 1004, and 1005, and the DMRS port group 2 is configured (associated) with the CDM group 1, that is, the DMRS ports 1002, 1003, 1006, and 1007. At this time, in a case that the DMRS antenna port numbers configured to the two DMRS port groups are indicated by the DCI, the terminal apparatus demodulates (decodes) the PDSCH as the power ratio of the DMRS and the PDSCH as 1 (0 dB) even in a case that the number of DMRS CDM groups without data is indicated two. In a case that the DMRS antenna port numbers configured only in one DMRS port group are indicated by the DCI, the terminal apparatus demodulates (decodes) the PDSCH as the power ratio of the DMRS and the PDSCH as 1 (0 dB).

The terminal apparatus can determine the power ratio of the DMRS and the PDSCH by the TCI. In a case that the received TCI is a configuration for two DMRS port groups, the terminal apparatus demodulates (decodes) the PDSCH as the power ratio of the DMRS and the PDSCH as 1 (0 dB), even in a case that the number of DMRS CDM groups without data is two or three. In other cases, the terminal apparatus determines the power ratio of the DMRS and the PDSCH according to the number of DMRS CDM groups without data.

The initial value of the DMRS sequence is calculated based on at least the NID and the SCID. The SCID is configured at most in two Ids and is indicated as 0 or 1. The NID is associated with the SCID and is configured by higher layer signaling. For example, NID for SCID=0 and NID for SCID=1 are configured. In a case that the NID or SCID is not configured, the SCID is SCID=0 and the NID is a physical cell ID. The SCID is included in the DCI. The SCID may indicate whether or not to demodulate (decode) the PDSCH in consideration of the power ratio of the DMRS and the PDSCH. For example, in a case of SCID=0, the terminal apparatus demodulates (decodes) the PDSCH in consideration of the power ratio of the DMRS and the PDSCH according to the number of DMRS CDM groups without data, and in a case of SCID=1, the terminal apparatus demodulates (decodes) the PDSCH without considering the power ratio of the DMRS and the PDSCH. The SCID and DMRS port groups may be associated with each other. For example, a sequence of SCID=0 is generated for the DMRS associated with the DMRS port group 1, and a sequence of SCID=1 is generated for the DMRS associated with the DMRS port group 2.

Note that in a case that multiple base station apparatuses (transmission and/or reception points) communicate with a terminal apparatus, and that each of the base station apparatuses transmits a PDCCH to the terminal apparatus in the same slot, each of the base station apparatuses can spatial multiplex different terminal apparatuses by MU-MIMO. For example, consider a case of transmitting PDCCH 1 (DCI 1) from the base station apparatus 3A to the terminal apparatus 4A and transmitting the PDCCH 2 (DCI 2) from the base station apparatus 5A to the terminal apparatus 4A. Note that the PDCCH 1 and the PDCCH 2 are transmitted in the same slot. Although not illustrated, it is assumed that the base station apparatus 5A spatially multiplexes the terminal apparatus 4A and the terminal apparatus 4B. Assuming the DMRS configuration type 2, and it is also assumed that the base station apparatus 3A configures the DMRS ports 1000, 1001, 1006, and 1007 as the DMRS port group 1, and configures the DMRS ports 1002, 1003, 1008, and 1009 as the DMRS port group 2 for the terminal apparatus 4A. The DMRS port numbers included in the DCI 1 are 1000, 1001, 1006, and 1007, and the number of CDM groups without data is two. The DMRS port numbers included in the DCI 1 are 1002, 1003, 1008, and 1009, and the number of CDM groups without data is three. At this time, the base station apparatus 5A communicates with the terminal apparatus 4B by using the DMRS port numbers 1004, 1005, 1010, and 1011. At this time, the terminal apparatus 4A recognizes that the DMRS of the DMRS port group 1 is indicated by the DCI 1, and the DMRS of the DMRS port group 2 is indicated by the DCI 2. Therefore, since two DMRS CDM groups without data indicated by the DCI 1 is used for the transmission addressed to the apparatus itself, it is possible to determine that the power ratio to the PDSCH corresponding to the DMRS DMRS ports 1000, 1001, 1006, and 1007 indicated by the DCI 1 is 1 (0 dB). Since two CDM groups without data of the three CDM groups without data indicated by the DCI 2 are used for the transmission addressed to the apparatus itself, it is possible to determine that the power ratio to the PDSCH corresponding to the DMRS ports 1002, 1003, 1008, and 1009 indicated by the DCI 2 is 2 (3 dB). In other words, in a case that the terminal apparatus receives two PDCCHs in the same slot, the terminal apparatus can determine the power ratio of the DMRS and the PDSCH, in consideration of the number of subtracting 1 from the number of DMRS CDM groups without data indicated in one DCI.

The same or different pieces of data can be transmitted from multiple base station apparatuses (transmission and/or reception points) on one PDCCH.

The base station apparatus 3A and the base station apparatus 5A can be configured for either transmitting the same downlink data or transmitting different downlink data, based on the number of transport blocks configured by the DCI 1. For example, in a case that the number of transport blocks configured by the DCI 1 is one, the base station apparatus 3A and the base station apparatus 5A can transmit the same downlink data. At this time, the base station apparatus 3A and the base station apparatus 5A can transmit the same downlink data by the same DMRS port, or can transmit the same downlink data by different DMRS ports. The base station apparatus 3A and the base station apparatus 5A can be configured with the DMRS port for transmitting the downlink data, based on the number of layers configured by the DCI 1 and the number of layers limited for each transmission and/or reception point. According to another example, in a case that the number of transport blocks configured by the DCI 1 is two, the base station apparatus 3A and the base station apparatus 5A can transmit different downlink data. At this time as well, the base station apparatus 3A and the base station apparatus 5A can transmit the downlink data by the same DMRS port, or can transmit the downlink data by different DMRS ports. Thus, the terminal apparatus 4A can determine, based on the number of transport blocks configured by the DCI 1, whether the same downlink data is transmitted or different downlink data is transmitted from the multiple base station apparatuses, for the received downlink data. Note that in a case that one transport block is configured to be indicated by one PDCCH (DCI) in higher layer signaling, the terminal apparatus 4A may not assume that different downlink data is transmitted from multiple base station apparatuses in one PDCCH (for example, DMRS ports that are not QCL).

The base station apparatus 3A and the base station apparatus 5A can be configured for either transmitting the same downlink data or transmitting different downlink data, based on the number of layers (the number of DMRS ports) configured by the DCI 1. In other words, in a case that a value greater than or equal to a prescribed value is configured to the number of layers configured by the DCI 1, the base station apparatus 3A and the base station apparatus 5A can transmit the same downlink data. The base station apparatus 3A and the base station apparatus 5A can be configured for whether to transmit the same downlink data or to transmit different downlink data, based on the slot size (size of the mini-slot) or subcarrier spacing configured in the downlink data. In a case that the base station apparatus 3A and the base station apparatus 5A transmit downlink data in slots including less than 14 OFDM symbols, the same downlink data can be transmitted. In a case that the base station apparatus 3A and the base station apparatus 5A transmit downlink data at subcarrier spacing wider than 15 KHz, the same downlink data can be transmitted. Thus, the terminal apparatus 4 can determine, based on the number of layers (the number of DMRS ports) configured by the DCI 1 and the slot size or subcarrier spacing configured to the higher layer and the DCI 1, whether the same downlink data is transmitted or different downlink data is transmitted from the multiple base station apparatuses, for the received downlink data.

The base station apparatus 3A and the base station apparatus 5A can be configured for either transmitting the same downlink data or transmitting different downlink data in accordance with the frequency band. In other words, the base station apparatus 3A and the base station apparatus 5A can transmit the same downlink data in a frequency band at a prescribed frequency or higher. In a case that the base station apparatus 3A and the base station apparatus 5A have different frequency bands for transmitting downlink data, the base station apparatus 3A and the base station apparatus 5A can transmit the same downlink data. Thus, the terminal apparatus 4 can determine whether the same downlink data is transmitted or different downlink data is transmitted from the multiple base station apparatuses, based on the frequency band configured to the base station apparatus to which the terminal apparatus 4 connects.

The base station apparatus 3A and the base station apparatus 5A can describe information indicating whether the base station apparatus 3A and the base station apparatus 5A transmit the same downlink data or transmit different downlink data to CSI configuration information required by the terminal apparatus 4A, trigger information requesting CSI, or CSI-RS configuration information. The terminal apparatus 4A can configure the CSI calculation method, the information included in the CSI, the feedback period, and the like, based on whether the information can be understood or not. For example, in a case that the trigger information requesting the CSI is described with information indicating that the base station apparatus 3A and the base station apparatus 5A transmit the same downlink data, the terminal apparatus 4A calculates the RI from the value smaller than or equal to a prescribed value as the CSI, rather than feeding back RI calculated from the received reference signal (e.g., CSI-RS), in calculating the CSI. For example, the terminal apparatus 4A can assume that the base station apparatus 3A and the base station apparatus 5A transmit different downlink data, divide the CSI-RS (CSI-RS port) into multiple groups (or multiple CSI-RS resources are configured) based on a prescribed rule (for example, information on QCL, or the like), calculate the CSI for each group (CSI-RS resource), and feedback (report) the CSI to the base station apparatus. Note that in a case that multiple CSI-RS groups (CSI-RS resources) are transmitted (configured), and that the terminal apparatus 4A can receive multiple CSI-RS groups (CSI-RS resources) simultaneously (at the same timing) in one or more spatial reception filters (receive beam directions), the terminal apparatus 4A can measure (calculate) and report the CSI, based on the multiple CSI-RS groups (CSI-RS resources). At this time, the CSI separately calculated by the terminal apparatus 4A can be calculated assuming the same target quality (target packet (block) error rate). However, the target quality may be a different value, assuming whether the base station apparatus 3A and the base station apparatus 5A transmit the same downlink data or transmit different downlink data. For example, in a case that the target packet (block) error rate is assumed to be 0.1, the terminal apparatus 4A can measure (calculate) the CSI assuming that different downlink data has been transmitted from the two base station apparatuses. For example, in a case that the target packet (block) error rate is assumed to be less than 0.1 (e.g., 0.00001), the terminal apparatus 4A can measure (calculate) the CSI assuming that the same downlink data has been transmitted from the two base station apparatuses. Note that the target packet (block) error rate may be associated with the CQI (MCS) table.

For example, the PDCCH 1 (DCI 1) can be transmitted from the base station apparatus 3A to the terminal apparatus 4A, and the same or different downlink data (transport blocks) can be transmitted to the terminal apparatus 4A from the base station apparatus 3A and the base station apparatus 5A. At this time, the base station apparatus 3A and the base station apparatus 5A may transmit downlink data by using the same DMRS port, or may transmit downlink data by using different DMRS ports. In a case that the base station apparatus 3A and the base station apparatus 5A transmit different downlink data on the same DMRS port, the DCI 1 includes two TCIs for which the QCL type D is configured. In a case that the base station apparatus 3A and the base station apparatus 5A transmit the same downlink data on the same DMRS port, the DCI 1 includes one or two TCIs for which the QCL type D is configured. Note that in a case that two TCIs for which the QCL type D is configured is included in the DCI 1, the first TCI and the second TCI may indicate the same content (the receive beam, the spatial reception filter).

In a case that the number of DMRS ports included in the DCI 1 is greater than or equal to five, the base station apparatus 3A and the base station apparatus 5A can transmit the same downlink data on the same DMRS port, or the base station apparatus 3A and the base station apparatus 5A can transmit different downlink data on different DMRS ports. Note that, in order to reduce the number of layers that the terminal apparatus 4A demodulates at a time, in a case that multiple base station apparatuses (transmission and/or reception points) transmit the same downlink data in one PDCCH and in a case that multiple base station apparatuses (transmission and/or reception points) transmit different downlink data in one PDCCH, each base station apparatus (transmission and/or reception point) may be limited to transmission of four or fewer layers. At this time, in a case that the number of DMRS ports included in the DCI 1 is greater than or equal to five, the base station apparatus 3A and the base station apparatus 5A transmit different downlink data on different DMRS ports.

Note that, in a case that multiple base station apparatuses (transmission and/or reception points) transmit different downlink data in one PDCCH in order to reduce the number of layers that the terminal apparatus 4A demodulates at a time, each base station apparatus (transmission and/or reception point) may be limited to transmission of four or fewer layers, and in a case that multiple base station apparatuses (transmission and/or reception points) transmit the same downlink data in one PDCCH, the number of transmission layers of each base station apparatus (transmission and/or reception point) may not be limited. At this time, in a case that the number of DMRS ports (the number of layers) included in the DCI 1 is greater than or equal to five, the base station apparatus 3A and the base station apparatus 5A transmit the same downlink data on the same DMRS port, or the base station apparatus 3A and the base station apparatus 5A transmit different downlink data on different DMRS ports. Note that, in order to avoid the complexity of the terminal apparatus 4A, in a case that the number of DMRS ports (the number of layers) included in the DCI 1 is greater than or equal to five, it may be limited whether the base station apparatus 3A and the base station apparatus 5A transmit the same downlink data on the same DMRS port, or the base station apparatus 3A and the base station apparatus 5A transmit different downlink data on different DMRS ports.

In a case that the number of DMRS ports (the number of layers) included in the DCI 1 is equal to or less than four, the base station apparatus 3A and the base station apparatus 5A can transmit the same downlink data on different DMRS ports, the base station apparatus 3A and the base station apparatus 5A can transmit different downlink data on different DMRS ports, or the base station apparatus 3A and the base station apparatus 5A can transmit different downlink data on the same DMRS port. Note that in a case that the base station apparatus 3A and the base station apparatus 5A transmit different downlink data, and that the number of DMRS ports (the number of layers) indicated by the DCI 1 is equal to or less than four, the base station apparatus 3A and the base station apparatus 5A can transmit two codewords (transport blocks). In this case, in a case that the number of DMRS ports (the number of layers) included in the DCI 1 is equal to or less than four, and that the number of transport blocks configured by the DCI 1 is one, the base station apparatus 3A and the base station apparatus 5A transmit the same downlink data on different DMRS ports. In a case that the number of DMRS ports (the number of layers) included in the DCI 1 is equal to or less than four, and that the number of transport blocks configured by the DCI 1 is two, the base station apparatus 3A and the base station apparatus 5A transmit different downlink data on different DMRS ports. Note that, in a case that the number of DMRS ports (the number of layers) indicated by the DCI 1 is equal to or less than four, and that the base station apparatus 3A and the base station apparatus 5A do not transmit or are configured not to transmit two codewords (transport blocks), and that the number of transport blocks configured by the DCI 1 is two, the base station apparatus 3A and the base station apparatus 5A transmit different downlink data on the same DMRS port.

For example, two DMRS port groups can be configured, the PDCCH 1 (DCI 1) can be transmitted from the base station apparatus 3A to the terminal apparatus 4A, and the base station apparatus 3A and the base station apparatus 5A can transmit the same or different downlink data (transport blocks) on different DMRS ports to the terminal apparatus 4A. In a case that the number of transport blocks configured by the DCI 1 is one, the base station apparatus 3A and the base station apparatus 5A transmit the same downlink data. In a case that the number of transport blocks configured by the DCI 1 is two, the base station apparatus 3A and the base station apparatus 5A transmit different downlink data. Note that each DMRS port group can transmit one codeword (transport block). In this case, in a case that the number of DMRS ports (the number of layers) included in the DCI 1 is equal to or less than four and the DMRS ports belong to two DMRS port groups, and that the number of transport blocks configured by the DCI 1 is one, the base station apparatus 3A and the base station apparatus 5A transmit the same downlink data on different DMRS ports. In a case that the number of DMRS ports (the number of layers) included in the DCI 1 is equal to or less than four and the DMRS ports belong to two DMRS port groups, and that the number of transport blocks configured by the DCI 1 is two, the base station apparatus 3A and the base station apparatus 5A transmit different downlink data on different DMRS ports. Note that, in order to reduce the number of layers that the terminal apparatus 4A demodulates at a time, in a case that multiple base station apparatuses (transmission and/or reception points) transmit the same or different downlink data in one PDCCH, each base station apparatus may be limited to transmission of four or fewer layers. At this time, in a case that the number of DMRS ports (the number of layers) included in the DCI 1 is greater than or equal to five, the base station apparatus 3A and the base station apparatus 5 transmit different downlink data. Note that in a case that two TCIs for which the QCL type D is configured is included in the DCI 1, the first TCI is associated with the first DMRS port group, and the second TCI is associated with the second DMRS port group.

In a case that two DMRS port groups are configured, it may mean that each DMRS port group transmits different downlink data. In this case, in a case that two DMRS port groups are not configured, the base station apparatus 3A and the base station apparatus 5A transmit the same downlink data.

Note that the configuration of the transport block included in the DCI includes an MCS, RV, and New Data Indicator (NDI). Note that, in a case that the transport block is disabled, the base station apparatus configures the MCS to be 26 and the RV to be 1. Accordingly, the terminal apparatus can determine whether the transport block is enabled or disabled from the configuration value (parameter) of the transport block included in the DCL Note that the number of transport blocks configured by the DCI indicates the number of transport blocks that are enabled (not disabled).

In a case that the PDCCH 1 (DCI 1) is transmitted from the base station apparatus 3A to the terminal apparatus 4A, and the base station apparatus 3A and the base station apparatus 5A transmit the same or different downlink data on the same or different DMRS ports, the terminal apparatus 4A needs to receive the PDCCH 1 (DCI 1) and determine whether the base station apparatus 3A and the base station apparatus 5A transmit the same or different downlink data on the same or different DMRS ports. In a case that one TCI for which the QCL type D included in the DCI 1 is configured is included, the terminal apparatus 4A receives by the spatial reception filter indicated by the TCI and demodulates the PDSCH. In a case that two TCIs for which the QCL type D included in the DCI 1 is configured is included, the terminal apparatus 4A can determine that the same/or different downlink data is received at the same or different DMRS ports from the base station apparatus 3A and the base station apparatus 5A. At this time, in a case that the number of DMRS ports indicated by the DCI 1 is greater than or equal to five, the terminal apparatus 4A can determine that the same downlink data is received at the same DMRS port from the base station apparatus 3A and the base station apparatus 5A, or different downlink data is received at different DMRS ports from the base station apparatus 3A and the base station apparatus 5A. In a case that multiple base station apparatuses (transmission and/or reception points) transmit different downlink data in one PDCCH, each base station apparatus (transmission and/or reception point) may be limited to transmission of four or fewer layers. At this time, in a case that the number of DMRS ports indicated by the DCI 1 is greater than or equal to five, the terminal apparatus 4A can determine that the same downlink data is received at the same DMRS port from the base station apparatus 3A and the base station apparatus 5A. Note that in a case that multiple base station apparatuses (transmission and/or reception points) transmit the same or different downlink data in one PDCCH, each base station apparatus (transmission and/or reception point) may be limited to transmission of four or fewer layers. At this time, in a case that the number of DMRS ports indicated by the DCI 1 is greater than or equal to five, the terminal apparatus 4A can determine that different downlink data is received at different DMRS ports from the base station apparatus 3A and the base station apparatus 5A. In a case that the terminal apparatus 4A determines that the same downlink data is received at the same DMRS port from the base station apparatus 3A and the base station apparatus 5A, the terminal apparatus 4A selects or combines and demodulates the first PDSCH received based on the first TCI of the two TCIs for which the QCL type D included in the DCI 1 is configured, and the second PDSCH received based on the second TCI, and decodes the two transport blocks. In a case that the terminal apparatus 4A determines that different downlink data is received at different DMRS ports from the base station apparatus 3A and the base station apparatus 5A, the terminal apparatus 4A divides the DMRS ports indicated by the DCI 1 into two numbers of layers (transport blocks, codeword), demodulates the first PDSCH received based on the first TCI to decode the first transport block, and demodulates the second PDSCH received based on the second TCI to decode the second transport block. In a case that the number of DMRS ports indicated by the DCI 1 is equal to or less than four, the terminal apparatus 4A receives the same downlink data at different DMRS ports from the base station apparatus 3A and the base station apparatus 5A, receives different downlink data at different DMRS ports from the base station apparatus 3A and the base station apparatus 5A, or receives different downlink data at the same DMRS port from the base station apparatus 3A and the base station apparatus 5A. Note that in a case that the base station apparatus 3A and the base station apparatus 5A transmit different downlink data, and that the number of DMRS ports (the number of layers) indicated by the DCI 1 is equal to or less than four, the base station apparatus 3A and the base station apparatus 5A can transmit two codewords (transport blocks). At this time, in a case that the number of DMRS ports (the number of layers) indicated by the DCI 1 is equal to or less than four, and that the number of transport blocks configured by the DCI 1 is one, the terminal apparatus 4A can determine that the same downlink data is received at different DMRS ports. In a case that the number of DMRS ports (the number of layers) indicated by the DCI 1 is equal to or less than four, and that the number of transport blocks configured by the DCI 1 is two, the terminal apparatus 4A can determine that different downlink data is received at different DMRS ports. In a case that the terminal apparatus 4A determines that the same downlink data is received at different DMRS ports from the base station apparatus 3A and the base station apparatus 5A, the terminal apparatus 4A divides the DMRS ports indicated by the DCI 1 into two layers, selects or combines and demodulates the first PDSCH received based on the first TCI and the second PDSCH received based on the second TCI, and decodes one transport block. Note that in this case, the number of DMRS ports (the number of layers) indicated by the DCI 1 and the number of DMRS ports in the transport block (the number of layers) are different, so the terminal apparatus 4A calculates the transport block size, based on the number of DMRS ports (the number of layers) of the transport block. In a case that the terminal apparatus 4A determines that different downlink data is received at different DMRS ports from the base station apparatus 3A and the base station apparatus 5A, the terminal apparatus 4A demodulates the first PDSCH received based on the first TCI to decode the first transport block, and demodulates the second PDSCH received based on the second TCI to decode the second transport block. Note that, in the case that the number of DMRS ports (the number of layers) indicated by the DCI 1 is equal to or less than four, and that the base station apparatus 3A and the base station apparatus 5A do not transmit or are configured not to transmit two codewords (transport blocks), and that the number of transport blocks configured by the DCI 1 is two, the terminal apparatus 4A can determine that different downlink data is received at the same DMRS port from the base station apparatus 3A and the base station apparatus 5A. In a case that the terminal apparatus 4A determines that different downlink data is received at the same DMRS port from the base station apparatus 3A and the base station apparatus 5A, the terminal apparatus 4A demodulates the first PDSCH received at the first TCI with the number of DMRS ports (the number of layers) indicated by the DCI 1 to decode the first transport block, and demodulates the second PDSCH received at the second TCI with the number of DMRS ports (the number of layers) indicated by the DCI 1 to decode the second transport block. The terminal apparatus 4A transmits the ACK/NACK information of the first transport block and the second transport block with the PUCCH resource indicated by the DCI 1.

In a case that two DMRS port groups are configured, the PDCCH 1 (DCI 1) is transmitted from the base station apparatus 3A to the terminal apparatus 4A, and the base station apparatus 3A and the base station apparatus 5A transmit the same or different downlink data (transport block) to the terminal apparatus 4A at different DMRS ports, the terminal apparatus 4A needs to receive the PDCCH 1 (DCI 1) and determine whether the base station apparatus 3A and the base station apparatus 5A transmit the same or different downlink data on different DMRS ports. In a case that the number of transport blocks configured by the DCI 1 is one, the terminal apparatus 4A can determine that the same downlink data is received from the base station apparatus 3A and the base station apparatus 5A. In this case, the terminal apparatus 4A selects or combines the first PDSCH demodulated in the DMRS of the first DMRS port group and the second PDSCH demodulated in the second DMRS port group to decode one transport block. In a case that the number of transport blocks configured by the DCI 1 is two, the terminal apparatus 4A can determine that different downlink data is received from the base station apparatus 3A and the base station apparatus 5A. In this case, the terminal apparatus 4A demodulates the first PDSCH in the DMRS of the first DMRS port group to decode the first transport block, and demodulates the second PDSCH in the DMRS of the second DMRS port group to decode the second transport block. Note that each DMRS port group can transmit one codeword (transport block). In this case, in a case that the number of DMRS ports (the number of layers) included in the DCI 1 is equal to or less than four and the DMRS ports belong to two DMRS port groups, and that the number of transport blocks configured by the DCI 1 is one, the terminal apparatus 4A can determine that the same downlink data is received at different DMRS ports from the base station apparatus 3A and the base station apparatus 5A. Note that in this case, the number of DMRS ports (the number of layers) indicated by the DCI 1 and the number of DMRS ports in the transport block (the number of layers) are different, so the terminal apparatus 4A calculates the transport block size, based on the number of DMRS ports (the number of layers) of the transport block. In a case that the number of DMRS ports (the number of layers) included in the DCI 1 is equal to or less than four and the DMRS ports belong to two DMRS port groups, and that the number of transport blocks configured by the DCI 1 is two, the terminal apparatus 4A can determine that different downlink data are received at different DMRS ports from the base station apparatus 3A and the base station apparatus 5A. Note that, in order to reduce the number of layers that the terminal apparatus 4A demodulates at a time, in a case that multiple base station apparatuses (transmission and/or reception points) transmit the same or different downlink data in one PDCCH, each base station apparatus may be limited to transmission of four or fewer layers. At this time, in a case that the number of DMRS ports (the number of layers) included in the DCI 1 is greater than or equal to five, the terminal apparatus 4A can determine that different downlink data is received from the base station apparatus 3A and the base station apparatus 5. Note that in a case that two TCIs for which the QCL type D is configured is included in the DCI 1, the first TCI is associated with the first DMRS port group, and the second TCI is associated with the second DMRS port group. At this time, the terminal apparatus 4A receives the DMRS of the first DMRS port group based on the first TCI and receives the DMRS of the second DMRS port group based on the second TCI.

In a case that two DMRS port groups are configured, it may mean that each DMRS port group transmits different downlink data. In this case, in a case that two DMRS port groups are not configured, the terminal apparatus 4A can determine that the same downlink data is received from the base station apparatus 3A and the base station apparatus 5A. In a case that two DMRS port groups are configured, the terminal apparatus 4A can determine that the same downlink data is received from the base station apparatus 3A and the base station apparatus 5A.

The terminal apparatus can assume, by the configuration of the TCI, whether the base station apparatus 3A and the base station apparatus 5A transmit the same downlink signal or transmit different downlink signals. For example, the terminal apparatus can configure the reception operation based on the value of Threshold-Sched-Offset, which is information associated with the offset (scheduling offset) between the resource for which the DCI is configured and the resource for which the PDSCH associated with the DCI is configured. For example, in a case that the offset between the resource for which the DCI is configured and the resource for which the PDSCH associated with the DCI is configured is less than a prescribed value (e.g., Threshold-Sched-Offset), the terminal apparatus configures the reception operation assuming whether the base station apparatus 3A and the base station apparatus 5A transmit the same downlink signal or transmit different downlink signals in advance, by higher layer signaling or the like. The terminal apparatus configures the reception operation by assuming whether the base station apparatus 3A and the base station apparatus 5A transmit the same downlink signal or transmit different downlink signals, based on the TCI state specified by the smallest index in multiple configured TCI states. In other words, the terminal apparatus can configure the reception operation, based on the configuration of the TCI default. Note that in a case that the terminal apparatus performs the reception operation based on the configuration of the TCI default, the terminal apparatus decodes downlink data (transport block) receivable in one spatial reception filter (receive beam direction). At this time, as the HARQ-ACK of the downlink data (transport block) that is failed to be received, NACK may be reported, information indicating failure to receive (e.g., Discontinuous Transmission (DTX), for example) may be reported, or nothing may be transmitted.

The terminal apparatus may receive inter-user interference from a serving cell or interference signals from neighbor cells. The terminal apparatus can improve reliability and throughput by canceling or suppressing the interference signals. In order to cancel or suppress the interference signals, parameters of the interference signals are required. The interference signals are PDSCHs, PDCCHs, or reference signals addressed to neighbor cells/other terminal apparatuses. Schemes for canceling or suppressing interference signals to apply include Enhanced-Minimum Mean Square Error (E-MMSE) to estimate the channels of the interference signals and suppress the interference by linear weight, an interference canceler that generates an interference signal replica to cancel the interference, Maximum Likelihood Detection (MLD), in which the desired signal and all of the interference signal transmission signal candidates are searched to detect the desired signal, and Reduced complexity-MLD (R-MLD) with a lower computation amount than the MLD by reducing the transmission signal candidates. In order to apply these schemes, channel estimation of the interference signals, demodulation of the interference signals, or decoding of the interference signals is required.

In order to efficiently cancel or suppress the interference signals, the terminal apparatus needs to recognize the parameters of the interference signals (neighbor cells). Thus, the base station apparatus can transmit (configure) assistance information including the parameters of the interference signals (neighbor cells) to the terminal apparatus to assist in the cancellation or suppression of the interference signals by the terminal apparatus. One or more pieces of assistance information are configured. The assistance information may include, for example, some or all of a physical cell ID, a virtual cell ID, a power ratio (power offset) between the reference signal and the PDSCH, a scrambling identity of the reference signal, a quasi co-location (QCL) information, a CSI-RS resource configuration, the number of CSI-RS antenna ports, a subcarrier spacing, resource allocation granularity, resource allocation information, Bandwidth Part Size configuration, DMRS configuration, DMRS antenna port numbers, the number of layers, a TDD DL/UL configuration, PMI, RI, a modulation scheme, Modulation and coding scheme (MCS), a TCI state, and PT-RS information. Note that the virtual cell ID is an ID virtually allocated to the cell, and cells may have the same physical cell ID and different virtual cell IDs. The QCL information is information about QCL for a prescribed antenna port, a prescribed signal, or a prescribed channel. The subcarrier spacing indicates subcarrier spacing of the interference signals or candidates for subcarrier spacing that may be used in the band. Note that, in a case that the subcarrier spacing included in the assistance information is different from the subcarrier spacing used in the communication with the serving cell, the terminal apparatus may not cancel or suppress the interference signals. The candidates for subcarrier spacing that may be used in the band may indicate a commonly used subcarrier spacing. For example, the commonly used subcarrier spacing may not include a low frequency subcarrier spacing as used for high reliability, low latency communication (emergency communication). The resource allocation granularity indicates the number of resource blocks in which the precoding (beamforming) does not change. The DMRS configuration indicates some or all of the PDSCH mapping type, the additional allocation of the DMRS, the power ratio of the DMRS to the PDSCH, the DMRS configuration type, the number of symbols of the front-loaded DMRS, and the information indicating OCC=2 or 4. The DMRS resource allocation varies depending on the PDSCH mapping type. For example, the PDSCH mapping type A maps the DMRS to the third symbol of the slot. For example, the PDSCH mapping type B maps the DMRS to the first OFDM symbol of the allocated PDSCH resource. The additional allocation of the DMRS indicates whether or not there is an additional DMRS allocation, or indicates the additional allocation. The PT-RS information includes some or all of the presence (presence/absence) of the PT-RS, the number of ports in the PT-RS, the time density, the frequency density, the resource allocation information, the associated DMRS ports (DMRS port group), and the power ratio of the PT-RS and the PDSCH. Note that some or all of the parameters included in the assistance information are transmitted (configured) by the higher layer signaling. Some or all of the parameters included in the assistance information are transmitted in the downlink control information. In a case that each of the parameters included in the assistance information indicates multiple candidates, the terminal apparatus performs blind detection of a preferable one from among candidates. The parameters not included in the assistance information is blind detected by the terminal apparatus.

In a case that the terminal apparatus communicates by using multiple receive beam directions, the ambient interference conditions vary greatly depending on the receive beam directions. For example, an interference signal that is strong in one receive beam direction may be weaker in another receive beam direction. The assistance information of the cell that is unlikely to have strong interference may not only be meaningless, but may also be wasteful for calculating in determining whether or not a strong interference signal is received. Accordingly, it is preferable that the assistance information be configured for each receive beam direction. However, since the base station apparatus does not necessarily recognize the reception direction of the terminal apparatus, information related to the receive beam direction and assistance information may be associated with each other. For example, since the terminal apparatus can associate the CRI with the receive beam direction, the base station apparatus can transmit (configure) one or more pieces of assistance information for each CRI. Since the terminal apparatus can associate time indexes of the synchronization signal block and the receive beam direction, the base station apparatus can transmit (configure) one or more pieces of assistance information for each time index of the synchronization signal block. Since the terminal apparatus can associate the PMI (antenna port number) with the receive beam direction, the base station apparatus can transmit (configure) one or more pieces of assistance information for each PMI (antenna port number). In a case that the terminal apparatus includes multiple subarrays, the receive beam direction is likely to change for each subarray, so the base station apparatus can transmit (configure) one or more pieces of assistance information for each index associated with the subarrays of the terminal apparatus. For example, since the terminal apparatus can associate the TCI with the receive beam direction, the base station apparatus can transmit (configure) one or more pieces of assistance information for each TCI. In a case that multiple base station apparatuses (transmission and/or reception points) communicate with a terminal apparatus, the terminal apparatus is likely to communicate in a receive beam direction different from each of the base station apparatuses (transmission and/or reception points). Thus, the base station apparatus transmits (configures) one or more pieces of assistance information for each information indicating the base station apparatus (transmission and/or reception point). The information indicating the base station apparatus (transmission and/or reception point) may be a physical cell ID or a virtual cell ID. In a case that different DMRS antenna port numbers are used for the base station apparatuses (transmission and/or reception points), information indicating the DMRS antenna port number or the DMRS antenna group is information indicating the base station apparatus (transmission and/or reception point).

Note that the number of pieces of assistance information configured by the base station apparatus for each CRI/TCI may be common. Here, the number of pieces of assistance information refers to the type of assistance information, the number of elements of each assistance information (e.g., the number of candidates for a cell ID), and the like. The number of pieces of assistance information configured by the base station apparatus for each CRI/TCI can be configured to a maximum value, and the base station apparatus can configure the assistance information for each CRI/TCI within the range of the maximum value.

Note that in a case that the value of the scheduling offset indicating the scheduling start position of the terminal apparatus is less than or equal to a prescribed value, it may cause a situation in which the terminal apparatus does not finish decoding of the DCI in time for the reception of the PDSCH. At this time, the terminal apparatus can receive the PDSCH in accordance with a default configuration (e.g., TCI default) configured in advance. In a case that interference suppression is performed, and that the scheduling offset is less than or equal to a prescribed value, the reception of the PDSCH (configuration of the spatial domain reception filter) follows the default configuration. However, for interference suppression, even in a case that the scheduling offset is less than or equal to a prescribed value, it is possible to follow the assistance information notified with the DCI. The base station apparatus can configure the terminal apparatus that receives the PDSCH in accordance with the TCI default so as to not perform interference suppression on the PDSCH received in accordance with the TCI default. In other words, the terminal apparatus can perform the reception operation without assuming interference suppression on the PDSCH received in accordance with the TCI default.

Note that in a case that the receive beam direction of the terminal apparatus changes, it is likely that the transmit antennas are not QCL. Accordingly, the assistance information can be associated with the QCL information. For example, in a case that the base station apparatus transmits (configures) assistance information of multiple cells, the base station apparatus can indicate cells which are QCL (or cells which are not QCL) to the terminal apparatus.

Note that the terminal apparatus cancels or suppresses the interference signal by using assistance information associated with the CRI/TCI used for communication with the serving cell.

The base station apparatus may configure assistance information associated with the receive beam direction (CRI/time index of the synchronization signal block/PMI/antenna port number/subarray/TCI) and assistance information not associated with the receive beam direction (CRI/time index of the synchronization signal block/PMI/antenna port number/subarray/TCI). The assistance information associated with the receive beam direction and the assistance information not associated with the receive beam direction may be selectively used depending on the capability or category of the terminal apparatus. The capability or category of the terminal apparatus may indicate whether or not the terminal apparatus supports receive beamforming. The assistance information associated with the receive beam direction and the assistance information not associated with the receive beam direction may be selectively used depending on the frequency band. For example, the base station apparatus does not configure the assistance information associated with the receive beam direction at frequencies lower than 6 GHz. For example, the base station apparatus configures the assistance information associated with the receive beam direction only at frequencies higher than 6 GHz.

Note that the CRI may be associated with the CSI-RS resource set configuration ID. In a case that the base station apparatus indicates the CRI to the terminal apparatus, the base station apparatus may indicate the CRI and the CSI-RS resource set configuration ID together. Note that in a case that the CSI-RS resource set configuration ID is associated with one CRI or one receive beam direction, the base station apparatus may configure the assistance information for each CSI-RS resource set configuration ID.

In a case that the terminal apparatus cancels or suppresses interference between users, it is desirable for the base station apparatus to indicate that multi user transmission is likely to be performed to the terminal apparatus. The multi user transmission requiring interference cancellation or suppression by the terminal apparatus is also referred to as multi user MIMO transmission, Multi User Superposition Transmission, and Non-Orthogonal Multiple Access (NOMA). The base station apparatus can configure multi user MIMO transmission (MUST, NOMA) with higher layer signaling. In a case that multi user MIMO transmission (MUST, NOMA) is configured, the base station apparatus can transmit interference signal information for canceling or suppressing inter-user interference with the DCI. The interference signal information included in the DCI includes some or all of the presence of the interference signal, the modulation scheme of the interference signal, the DMRS port number of the interference signal, the number of DMRS CDM groups without data of the interference signal, the power ratio of the DMRS and the PDSCH, the number of symbols of the front-loaded DMRS, the information indicating OCC=2 or 4, and the PT-RS information of the interference signal. The multi user MIMO can multiplex up to eight layers in the DMRS configuration type 1 and 12 layers in the DMRS configuration type 2. Therefore, the maximum number of interference layers is seven layers in the DMRS configuration type 1, and 11 layers in the DMRS configuration type 2. Thus, for example, in a case that there are seven bits in the DMRS configuration type 1 and 11 bits in the DMRS configuration type 2, the presence of interference can be indicated for each of the DMRS port numbers that are likely to interfere with. In a case that there are 14 bits in the DMRS configuration type 1 and 22 bits in the DMRS configuration type 2, the presence of interference and three types of modulation schemes (e.g., QPSK, 16QAM, 64QAM) can be indicated for each of the DMRS port numbers that are likely to interfere with.

Note that cancellation or suppression of the interference signal can be achieved by canceling or suppressing a dominant portion of the interference signal without canceling or suppressing all the interference layers. Accordingly, the base station apparatus can transmit interference signal information for some interference layers. In this case, the amount of control information can be reduced than transmitting the interference signal information for all interference layers. The base station apparatus can configure the maximum number of interference layers with higher layer signaling. In this case, the base station apparatus transmits interference signal information on the interference layer less than or equal to the maximum number of interference layers. At this time, the interference signal information includes information of DMRS ports less than or equal to the maximum number of interference layers. As a result, tradeoffs in the effects of interference cancellation or suppression and the amount of control information can be considered depending on the maximum number of interference layers. Note that the base station apparatus may configure DMRS port groups which may be interference, with higher layer signaling. In this case, the maximum number of interference layers can be suppressed and the DMRS port numbers that can be interference can be indicated. The base station apparatus may configure DMRS CDM groups which may be interference, with higher layer signaling. In this case, the maximum number of interference layers can be suppressed and the DMRS port numbers that can be interference can be indicated. The number of layers that can be multiplexed varies depending on the DMRS configuration type or OCC=2 or 4. Accordingly, the maximum number of layers can be associated with the DMRS configuration type that can be supported or OCC=2 or 4. In this case, the amount of control information can be reduced. For example, the maximum number of layers 4 can indicate OCC=2 in the DMRS configuration type 1. For example, the maximum number of layers 6 can indicate OCC=2 in the DMRS configuration type 2. For example, the maximum number of layers 8 can indicate OCC=2 or 4 in the DMRS configuration type 1. For example, the maximum number of layers 12 can indicate OCC=2 or 4 in the DMRS configuration type 2. Note that the candidates for the DMRS port numbers of interference varies depending on OCC=2 or 4. For example, in a case of OCC=2 in the DMRS configuration type 1, the DMRS port numbers to be interference are DMRS port numbers that are not used for the terminal apparatus itself among the DMRS port numbers 1000, 1001, 1002, and 1003. In a case of OCC=2 in the DMRS configuration type 2, the DMRS port numbers to be interference are DMRS port numbers that are not used for the terminal apparatus itself among 1000, 1001, 1002, 1003, 1004, and 1005.

The base station apparatus can classify the assistance information for notifying the terminal apparatus into the first assistance information and the second assistance information, and can set different values to the number of information included in the first assistance information and the number of pieces of information included in the second assistance information. In other words, the amount of information related to the first interference signal notified by the base station apparatus with the first assistance information can be configured to be greater than the amount of information related to the second interference signal notified with the second assistance information. For example, the base station apparatus can notify information indicating the modulation order of the interference signal and the DMRS port as the first assistance information, and can notify information indicating the DMRS port as the second assistance information. By controlling in this manner, the base station apparatus suppresses the overhead in accordance with the notification of the assistance information, and the terminal apparatus uses the first assistance information and the second assistance information to generate the receive spatial filter with precision in consideration of the first interference signal and the second interference signal, while generating a replica signal of the first interference signal having a large interference power. In this way, it is possible to perform a non-linear interference canceler.

Note that the assistance information that the base station apparatus notifies the terminal apparatus may vary depending on the frequency band in which the base station apparatus configures the component carrier (or BWP). For example, the base station apparatus is likely to transmit PT-RS in a case of performing high frequency transmission. Thus, the base station apparatus can classify frequencies at which component carriers may be configured into two frequency ranges, and, with respect to the frequency range 1 (FR1) including lower frequencies, set the amount of information of the assistance information associated with the component carrier that is configured to the frequency range 2 (FR2) including higher frequencies to be greater than the amount of information of the assistance information associated with the component carrier configured to the frequency range 1. For example, in a case that the base station apparatus performs communication with the FR1, the information on the PT-RS is not included in the assistance information, and in a case that the base station apparatus performs communication with the FR2, information on the PT-RS is included in the assistance information.

The PT-RS is transmitted for each UE. Accordingly, in a case that the PT-RS is transmitted, the terminal apparatus can recognize the number of PT-RS ports as long as the number of UEs to be multiplexed can be known. Since the PT-RS ports are associated with the DMRS ports, control information increases as the number of PT-RS ports increases. Thus, in a case that the base station apparatus configures the maximum number of interference UEs by the higher layer signaling, the number of PT-RS ports can be limited, and the amount of control information can be suppressed.

Since the presence of the PT-RS is related to the modulation scheme (MCS), the modulation scheme candidates can be limited by the presence or absence of the PT-RS. For example, in a case that the base station apparatus configures the PT-RS configuration, and in a case that the PT-RS is not transmitted, the modulation scheme of the interference signal can be determined to be QPSK, and in a case that the PT-RS is transmitted, the modulation scheme of the interference signal can be determined to be 16QAM, 64QAM, or 256QAM. Note that the PT-RS is likely to be transmitted in a high frequency band. In the high frequency band, since the modulation order tends to be low, the modulation scheme may be QPSK in the case of multi user transmission in the high frequency band (e.g., frequency band of 6 GHz or higher). In multi user transmission with the large spatial multiplexing order, the modulation scheme may be QPSK since the modulation order tends to be low. For example, in a case that the maximum number of interference layers or the maximum number of interference UEs exceeds a prescribed number, the modulation scheme may be QPSK. In a case that the modulation scheme is QPSK, the PT-RS is not transmitted, so the associated control information can be reduced.

The presence or absence of the PT-RS depends on the number of RBs allocated. In a case that the number of RBs configured to the terminal apparatus is less than a prescribed value (e.g., 3), the base station apparatus does not configure the PT-RS to the terminal apparatus. Therefore, in a case that the number of RBs allocated to the interference signal is less than a prescribed value, the terminal apparatus can perform the interference suppression processing assuming that the PT-RS is not configured for the interference signal. In order to suppress the overhead related to the notification of the PT-RS configuration information, in a case that the value of the configured time density, frequency density, or the values of both of the PT-RS is greater than or equal to a prescribed value, the base station apparatus may not include the PT-RS configuration information in the assistance information. Note that the time density of the PT-RS depends on the MCS configuration. In other words, the base station apparatus can be configured not to notify the terminal apparatus of the PT-RS configuration information associated with the interference signal, in a case that the MCS configured for the interference signal is greater than or equal to a prescribed value. The frequency density of the PT-RS depends on the scheduled bandwidth. In other words, the base station apparatus can be configured not to notify the terminal apparatus of the PT-RS configuration information associated with the interference signal in a case that the bandwidth configured for the interference signal is less than a prescribed value.

Note that the base station apparatus according to the present embodiment can determine the MCS to be configured to the PDSCH by reference to multiple MCS tables. Thus, in a case that the interference information includes an MCS, the base station apparatus may include information indicating the MCS table referred to by the index indicating the MCS in the interference information. The terminal apparatus may perform the interference suppression processing assuming that the index indicating the MCS associated with the interference signal refers to the same MCS table as the MCS table referred to by the index indicating the MCS configured to the PDSCH for the terminal apparatus itself. Similarly, the base station apparatus can include information indicating a codebook referred to by the index indicating the PMI in the interference information, and the terminal apparatus can perform interference suppression processing assuming that the codebook referred to by the index indicating the PMI is the same codebook as the codebook referred to by the PMI notified to the terminal apparatus itself.

In a case that the base station apparatus configures the PT-RS configuration and the configuration of the multi user transmission, the terminal apparatus may assume that the number of front-loaded DMRS symbols is one (OCC=2). In this case, the number of DMRS ports and port numbers that are candidates for interference can be limited by the PT-RS configuration. In a case that the base station apparatus configures the PT-RS configuration and the configuration of the multi user transmission, and that the number of front-loaded DMRS symbols addressed to the terminal apparatus itself is two, the terminal apparatus may assume that there is no inter-user interference.

In order to suppress control information related to the resource allocation of the interference signal (addressed to other apparatuses), it is desirable that resource allocation addressed to the terminal apparatus itself is included in resource allocation of the interference signal (addressed to other apparatuses). Accordingly, in a case that the multi user transmission is configured, the terminal apparatus assumes some or all of the same PDSCH mapping type, the same DMRS configuration type, and the same number of front-loaded DMRS symbols in the interference signal and the terminal apparatus itself.

Note that the frequency band used by the communication apparatus (base station apparatus and terminal apparatus) according to the present embodiment is not limited to the licensed bands and unlicensed bands described heretofore. Frequency bands to which the present embodiment is directed include frequency bands called white bands (white space) that are not actually used for the purpose of preventing interference between frequencies or the like even though the permission of use is given to specific services from the country or the district (e.g., frequency bands that are allocated for television broadcasting but are not used in some regions), or shared frequency bands (licensed shared bands) that have been exclusively assigned to particular operators, but are expected to be shared by multiple operators in the future.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a terminal apparatus and a communication method.

The invention claimed is:

1. A terminal apparatus configured to communicate with a base station apparatus, the terminal apparatus comprising:
   radio reception circuitry configured to receive:
      downlink control information (DCI),
      a first predetermined downlink signal and a second predetermined downlink signal,
      a physical downlink shared channel (PDSCH), and
      a demodulation reference signal (DMRS); and
   signal detection circuitry configured to demodulate the PDSCH based on the DMRS, wherein
   the first predetermined downlink signal is a first channel state information-reference signal (CSI-RS) or a first synchronization signal block (SSB), and the second predetermined downlink signal is a second CSI-RS or a second SSB,
   the DCI includes:
      antenna port information indicating one or more DMRS antenna ports, and
      a first transmission configuration indication (TCI) and a second TCI,
   each of the one or more DMRS antenna ports is included in a first DMRS antenna port group or a second DMRS antenna port group,
   the DMRS is classified into a first DMRS for the terminal apparatus and a second DMRS for the terminal apparatus,
   the first DMRS is included in the first DMRS antenna port group and the second DMRS is included in the second DMRS antenna port group,
   the first TCI indicates a first quasi-colocation (QCL) between the first predetermined downlink signal and the first DMRS, the first QCL having a QCL type D, the second TCI indicates a second QCL between the second predetermined downlink signal and the second DMRS, the second QCL having the QCL type D, and
   in a case where the antenna port information indicates that a number of the one or more DMRS antenna ports is more than 4, the radio reception circuitry receives:
      the first DMRS based on the first TCI and the first predetermined downlink signal, and
      the second DMRS based on the second TCI and the second predetermined downlink signal.

2. The terminal apparatus according to claim 1, wherein in a case where the antenna port information indicates that the number of the one or more DMRS antenna ports is less than 5, a first antenna port of the one or more DMRS antenna ports is included in the first DMRS antenna port group, and a second antenna port of the one or more DMRS antenna ports is included in the second DMRS antenna port group, the radio reception circuitry receives:
   the first DMRS based on the first TCI and the first predetermined downlink signal, and
   the second DMRS based on the second TCI and the second predetermined downlink signal.

3. A communication method for a terminal apparatus configured to communicate with a base station apparatus, the communication method comprising:
   receiving:
      downlink control information (DCI),
      a first predetermined downlink signal and a second predetermined downlink signal,
      a physical downlink shared channel (PDSCH), and
      a demodulation reference signal (DMRS); and
   demodulating the PDSCH based on the DMRS, wherein
   the first predetermined downlink signal is a first channel state information-reference signal (CSI-RS) or a first synchronization signal block (SSB), and the second predetermined downlink signal is a second CSI-RS or a second SSB,
   the DCI includes:
      antenna port information indicating one or more DMRS antenna ports, and
      a first transmission configuration indication (TCI) and a second TCI,
   each of the one or more DMRS antenna ports is included in a first DMRS antenna port group or a second DMRS antenna port group,
   the DMRS is classified into a first DMRS for the terminal apparatus and a second DMRS for the terminal apparatus,
   the first DMRS is included in the first DMRS antenna port group and the second DMRS is included in the second DMRS antenna port group,
   the first TCI indicates a first quasi-colocation (QCL) between the first predetermined downlink signal and the first DMRS, the first QCL having a QCL type D, the second TCI indicates a second QCL between the second predetermined downlink signal and the second DMRS, the second QCL having the QCL type D, and
   in a case where the antenna port information indicates that a number of the one or more DMRS antenna ports is more than 4, receiving the DMRS comprises receiving:
      the first DMRS based on the first TCI and the first predetermined downlink signal, and
      the second DMRS based on the second TCI and the second predetermined downlink signal.

* * * * *